United States Patent
Komatsu et al.

(10) Patent No.: US 10,328,803 B2
(45) Date of Patent: Jun. 25, 2019

(54) CONTROL METHOD AND CONTROL DEVICE FOR ELECTRIC VEHICLE

(71) Applicant: NISSAN MOTOR CO., LTD., Yokohama-shi, Kanagawa (JP)

(72) Inventors: Hiroyuki Komatsu, Kanagawa (JP); Ken Itou, Kanagawa (JP); Takashi Nakajima, Kanagawa (JP); Yuuji Katsumata, Kanagawa (JP); Akira Sawada, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/754,755

(22) PCT Filed: Aug. 10, 2016

(86) PCT No.: PCT/JP2016/073644
§ 371 (c)(1),
(2) Date: Feb. 23, 2018

(87) PCT Pub. No.: WO2017/033753
PCT Pub. Date: Mar. 2, 2017

(65) Prior Publication Data
US 2018/0244158 A1    Aug. 30, 2018

(30) Foreign Application Priority Data
Aug. 26, 2015  (JP) .................................. 2015-167173

(51) Int. Cl.
*B60L 7/26*     (2006.01)
*B60L 15/20*   (2006.01)
(Continued)

(52) U.S. Cl.
CPC .................. *B60L 7/26* (2013.01); *B60L 7/14* (2013.01); *B60L 7/18* (2013.01); *B60L 7/24* (2013.01);
(Continued)

(58) Field of Classification Search
CPC .......... B60L 7/26; B60L 7/18; B60L 15/2009; B60L 2240/12; B60L 2240/423;
(Continued)

(56) References Cited

U.S. PATENT DOCUMENTS

2005/0017580 A1 * 1/2005 Cikanek ................... B60K 6/46
                                                                 303/191
2005/0187671 A1 * 8/2005 Nada ................ B60W 30/18118
                                                                 701/1
(Continued)

FOREIGN PATENT DOCUMENTS

EP        3 251 906 A1    12/2017
JP        8-79907 A       3/1996
(Continued)

*Primary Examiner* — Marthe Y Marc-Coleman
(74) *Attorney, Agent, or Firm* — Foley & Lardner LLP

(57) ABSTRACT the control device for electric vehicle in the first embodiment, in the electric vehicle including the motor that functions as the traveling driving source and provides a regenerative braking force to the vehicle, and the friction brakes that provide the friction braking force to the vehicle, detects the motor rotation speed proportionate to a running speed of this electric vehicle, estimates the disturbance torque that acts on the motor, and performs the control such that the motor torque command value converges to the disturbance torque estimated value as the motor rotation speed decreases. Then, when the motor rotation speed becomes almost 0, the control device performs the control such that the friction-braking-amount command value with respect to the friction brakes converges to a value determined on the basis of the disturbance torque estimated value, and causes the motor torque command value to converge to almost 0.

12 Claims, 16 Drawing Sheets

(51) Int. Cl.
    *B60L 7/18*     (2006.01)
    *B60W 10/08*     (2006.01)
    *B60W 10/18*     (2012.01)
    *B60W 30/18*     (2012.01)
    *B60L 7/14*     (2006.01)
    *B60L 7/24*     (2006.01)

(52) U.S. Cl.
    CPC ........... *B60L 15/20* (2013.01); *B60L 15/2009* (2013.01); *B60W 10/08* (2013.01); *B60W 10/18* (2013.01); *B60W 30/18127* (2013.01); *B60L 2240/12* (2013.01); *B60L 2240/423* (2013.01); *B60L 2240/425* (2013.01); *B60L 2250/26* (2013.01); *B60W 2400/00* (2013.01); *B60W 2510/081* (2013.01); *B60W 2510/083* (2013.01); *B60W 2520/04* (2013.01); *B60W 2540/10* (2013.01); *B60W 2710/083* (2013.01); *B60W 2710/18* (2013.01); *Y02T 10/645* (2013.01); *Y02T 10/7275* (2013.01)

(58) Field of Classification Search
    CPC ... B60L 2250/26; B60W 10/08; B60W 10/18; B60W 30/18127; B60W 2400/00; B60W 2510/081; B60W 2510/083; B60W 2520/04; B60W 2540/10; B60W 2710/083; B60W 2710/18
    USPC .......................................................... 701/22
    See application file for complete search history.

(56) References Cited

U.S. PATENT DOCUMENTS

| | | | |
|---|---|---|---|
| 2010/0004806 A1* | 1/2010 | Soma | ..................... B60K 6/445 |
| | | | 701/22 |
| 2010/0174430 A1 | 7/2010 | Irie | |
| 2012/0056470 A1 | 3/2012 | Kim | |

FOREIGN PATENT DOCUMENTS

| | | |
|---|---|---|
| JP | 2007-143350 A | 6/2007 |
| JP | 2008-306815 A | 12/2008 |
| JP | 2012-091603 A | 5/2012 |
| JP | 2015-133799 A | 7/2015 |
| KR | 10-2012-0024001 A | 3/2012 |

\* cited by examiner

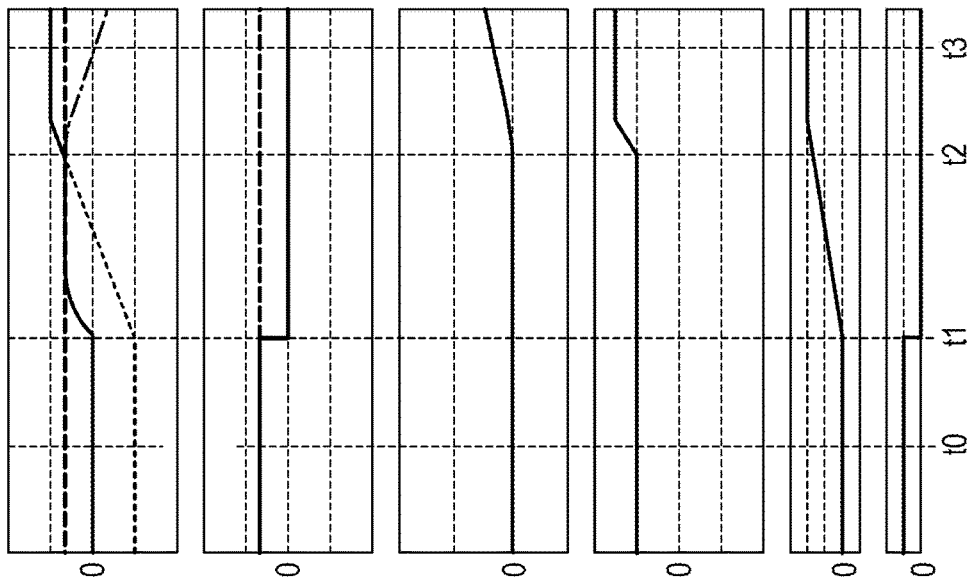
FIG. 12A DOWNHILL ROAD
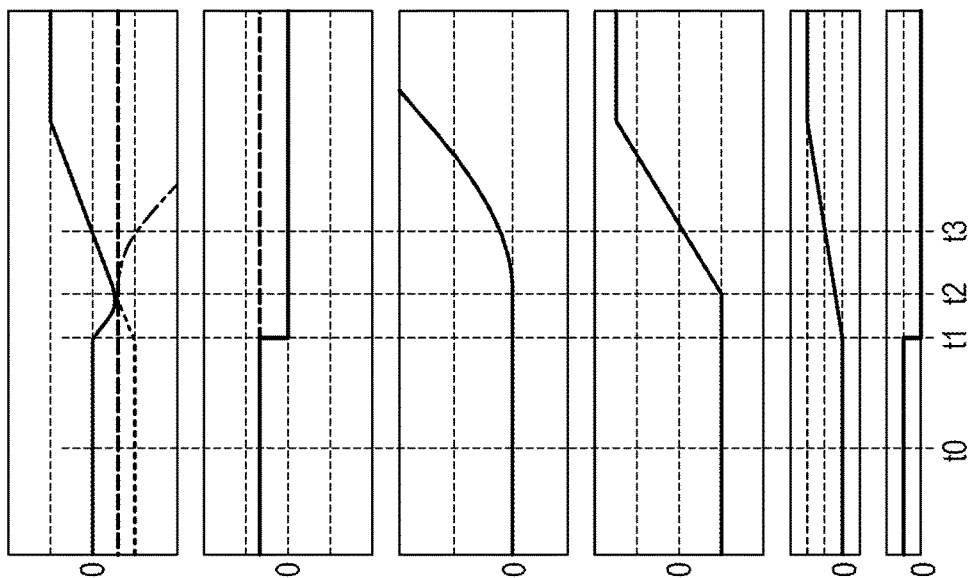
FIG. 12B UPHILL ROAD

CONTROL METHOD AND CONTROL DEVICE FOR ELECTRIC VEHICLE

TECHNICAL FIELD

The present invention relates to a control method and a control device for an electric vehicle.

BACKGROUND ART

Conventionally, a regenerative brake control device for electric cars provided with setting means capable of any given setting of a regenerative braking force of a motor and regenerates the motor by the regenerative braking force set by the setting means is known (see JPH08-79907A).

SUMMARY OF INVENTION

However, if the regenerative braking force set by the setting means is large, the technique in JPH08-79907A has the following problem. A vibration (an acceleration vibration) in a longitudinal direction of a vehicle body may be generated when the electric car is decelerated by the set regenerative braking force and the speed becomes 0.

For this problem, the present inventors examine ensuring a smooth deceleration without the acceleration vibration just before stop of the vehicle, and holding a vehicle stop state, irrespective of a flat road, an uphill road, and a downhill road, by adjusting a motor torque with a decrease in a motor rotation speed to have torque control means that causes the motor torque to converge to a disturbance torque estimated value that will be almost a gradient resistance.

However, in a situation where the motor torque continues to hold the vehicle stop state in a condition where a disturbance torque acts on a vehicle, especially, for example, on a slope road, it is necessary to continue to supply current to the motor, thus deteriorating electricity efficiency.

An object of the present invention is to provide a technique that ensures a smooth deceleration without an acceleration vibration just before stop of a vehicle, and reduces a current consumption quantity of a motor in a situation where a vehicle stop state is held to improve an electricity cost.

According to one embodiment of the present invention, the control device for electric vehicle in the first embodiment, in the electric vehicle including the motor that functions as the traveling driving source and provides a regenerative braking force to the vehicle, and the friction brakes that provide the friction braking force to the vehicle, detects the motor rotation speed proportionate to a running speed of this electric vehicle, estimates the disturbance torque that acts on the motor, and performs the control such that the motor torque command value converges to the disturbance torque estimated value as the motor rotation speed decreases. Then, when the motor rotation speed becomes almost 0, the control device performs the control such that the friction-braking-amount command value with respect to the friction brakes converges to a value determined on the basis of the disturbance torque estimated value, and causes the motor torque command value to converge to almost 0.

The following describes the embodiments of the present invention in detail with accompanying drawings.

BRIEF DESCRIPTION OF DRAWINGS

FIG. 12 is a diagram describing a control result by the control device for the electric vehicle according to the first embodiment.

DESCRIPTION OF EMBODIMENTS

The following describes an example that applies a control device for vehicle according to the present invention to an electric car.

—First Embodiment—

Figure 1:
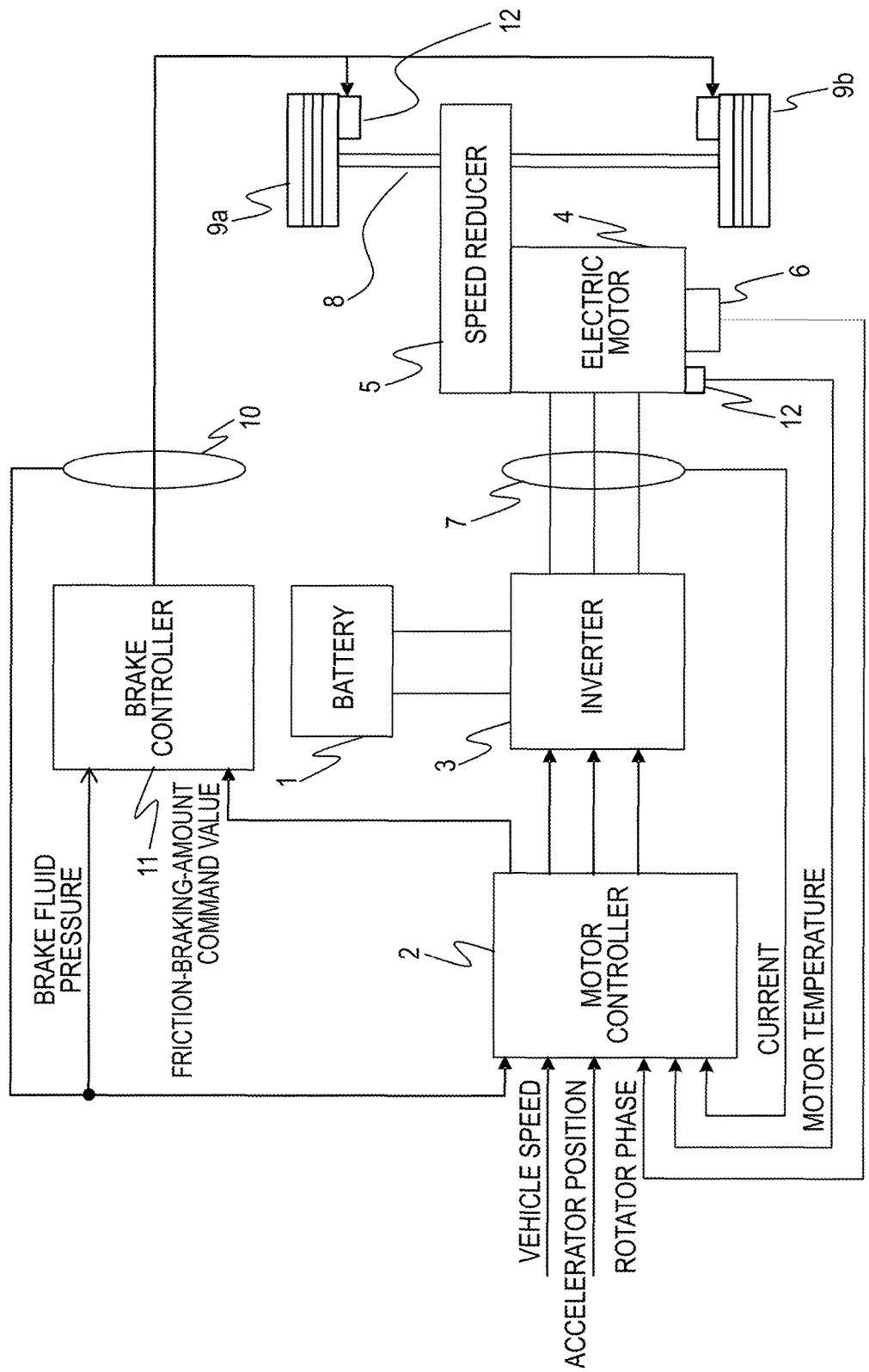
FIG. 1 is a block diagram illustrating a main configuration of an electric car with a control device for an electric vehicle according to a first embodiment.

FIG. 1 is a block diagram illustrating a main configuration of the electric car with a control device for vehicle according to a first embodiment. Particularly, the control device for vehicle according to the embodiment can be applied to a vehicle capable of controlling acceleration/deceleration and a stop of the vehicle only by an operation of an accelerator pedal. In this vehicle, a driver depresses the accelerator pedal during acceleration and reduces or zeros a depression amount of the depressed accelerator pedal during deceleration or during stop. It should be noted that, the vehicle approaches the stop state while the driver depresses the accelerator pedal to prevent the vehicle from retreating on uphill roads in some cases.

A motor controller 2 has signals indicating vehicle states such as a vehicle speed V, an accelerator position AP, a rotator phase α of a motor (three-phase alternating current motor) 4 and currents iu, iv, and iw of the motor 4, which are input to the motor controller 2 in the form of digital signals. The motor controller 2 generates PWM signals for controlling the motor 4 on the basis of the input signals. The motor controller 2 generates a drive signal of an inverter 3 by the generated PWM signal. The motor controller 2 further generates a friction-braking-amount command value by a method described later. It should be noted that the motor controller 2 has functions as a disturbance torque estimator, a friction-braking-amount controller, and a motor torque controller.

The inverter 3 turns on and off two switching elements (e.g. power semiconductor elements such as IGBTs or MOS-FETs) included for each phase to convert a direct current supplied from a battery 1 into an alternating current, thus flowing a desired current into the motor 4.

The motor 4 generates a drive force by the alternating current supplied from the inverter 3 and transmits the drive force to right and left drive wheels 9a and 9b via a speed reducer 5 and a drive shaft 8. Further, when being rotated following the rotation of the drive wheels 9a and 9b during the travel of the vehicle, the motor 4 generates a regenerative drive force, thereby collecting the kinetic energy of the vehicle as electrical energy. In this case, the inverter 3 converts an alternating current generated during the regenerative operation of the motor 4 into a direct current and supplies the direct current to the battery 1.

A current sensor 7 has a function as a speed parameter detector to detect the three-phase alternating currents iu, iv and iw flowing in the motor 4. Note that, since the sum of the three-phase alternating currents iu, iv and iw is 0, the currents of any of two phases may be detected and the current of the remaining one phase may be obtained by calculation.

A rotation sensor 6 is, for example, a resolver or an encoder and detects the rotator phase α of the motor 4.

A fluid pressure sensor 10 detects a brake fluid pressure of friction brakes 12.

A motor temperature sensor 12 detects a temperature of the motor 4.

A brake controller 11 has a function as a friction-braking-amount controller to generate the brake fluid pressure according to the friction-braking-amount command value, which is generated by the motor controller 2. The brake controller 11 also performs a feedback control such that the brake fluid pressure detected by the fluid pressure sensor 10 follows a value decided according to the friction-braking-amount command value.

The friction brakes 12 function as friction braking portions. Specifically, the friction brakes 12 are disposed at the right and left drive wheels 9a and 9b. The friction brake 12 presses a brake pad to a brake rotor according to the brake fluid pressure to generate a braking force to the vehicle.

Figure 2:
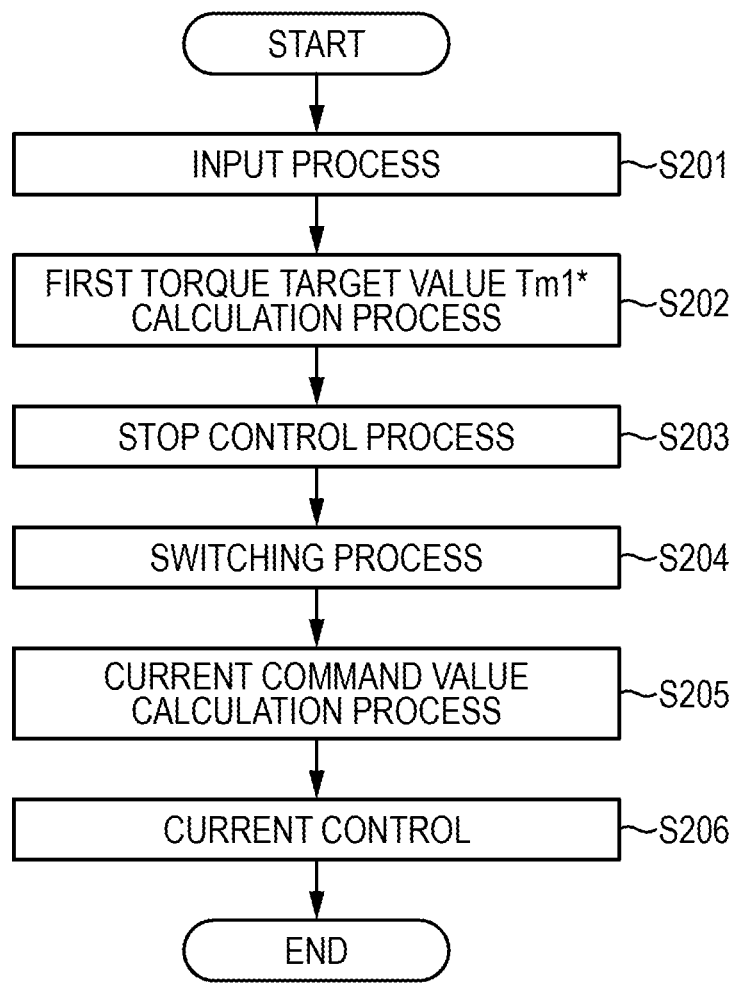
FIG. 2 is a flowchart showing a flow of processes for a motor current control performed by a motor controller.

FIG. 2 is a flowchart showing a flow of processes for a motor current control performed by the motor controller 2.

In Step S201, signals indicating the vehicle states are input to the motor controller 2. Here, the vehicle speed V (km/h), the accelerator position θ (%), the rotator phase α (rad) of the motor 4, a rotation speed Nm (rpm) of the motor 4, the three-phase alternating currents iu, iv and iw flowing in the motor 4, a direct-current voltage value $V_{dc}$ (V) between the battery 1 and the inverter 3, a power consumption (hereinafter referred to as a motor power consumption) of the motor 4, and the brake fluid pressure are input.

The vehicle speed V (kin/h) is obtained by a vehicle speed sensor or through communications from another controller (not illustrated). Alternatively, a vehicle speed v (m/s) is obtained by multiplying a rotator mechanical angular velocity ωm by a tire dynamic radius r and dividing the product by a gear ratio of a final gear, and then the obtained value is multiplied by 3600/1000 for unit conversion, thereby obtaining the vehicle speed V (km/h).

The accelerator position θ (%) (an amount of accelerator operation) is obtained from an accelerator position sensor (not illustrated) or through communications from another controller such as a vehicle controller (not illustrated).

The rotator phase α (rad) of the motor 4 is obtained from the rotation sensor 6. The rotation speed Nm (rpm) of the motor 4 is obtained by dividing a rotator angular velocity ω (electric angle) by a pole pair number ρ of the motor 4 to obtain a motor rotation speed ωm (rad/s), which is a mechanical angular velocity of the motor 4, and multiplying the obtained motor rotation speed ωm by 60/(2π). The rotator angular velocity ω is obtained by differentiating the rotator phase α.

The currents iu, iv and iw (A) flowing in the motor 4 are obtained from the current sensor 7.

The direct-current voltage value $V_{dc}$ (V) is obtained from a voltage sensor (not illustrated) provided in a direct-current power supply line between the battery 1 and the inverter 3 or a power supply voltage value transmitted from a battery controller (not illustrated).

The fluid pressure sensor 10 detects the brake fluid pressure.

A motor power consumption P (W) is obtained from P=R×(iu^2+iv^2+iw^2) in the basis of the currents iu, iv and iw (A) flowing in the motor 4, and a coil resistance R [Ω] of a winding wire (not illustrated) wound around a stator of the motor 4.

Figure 3:
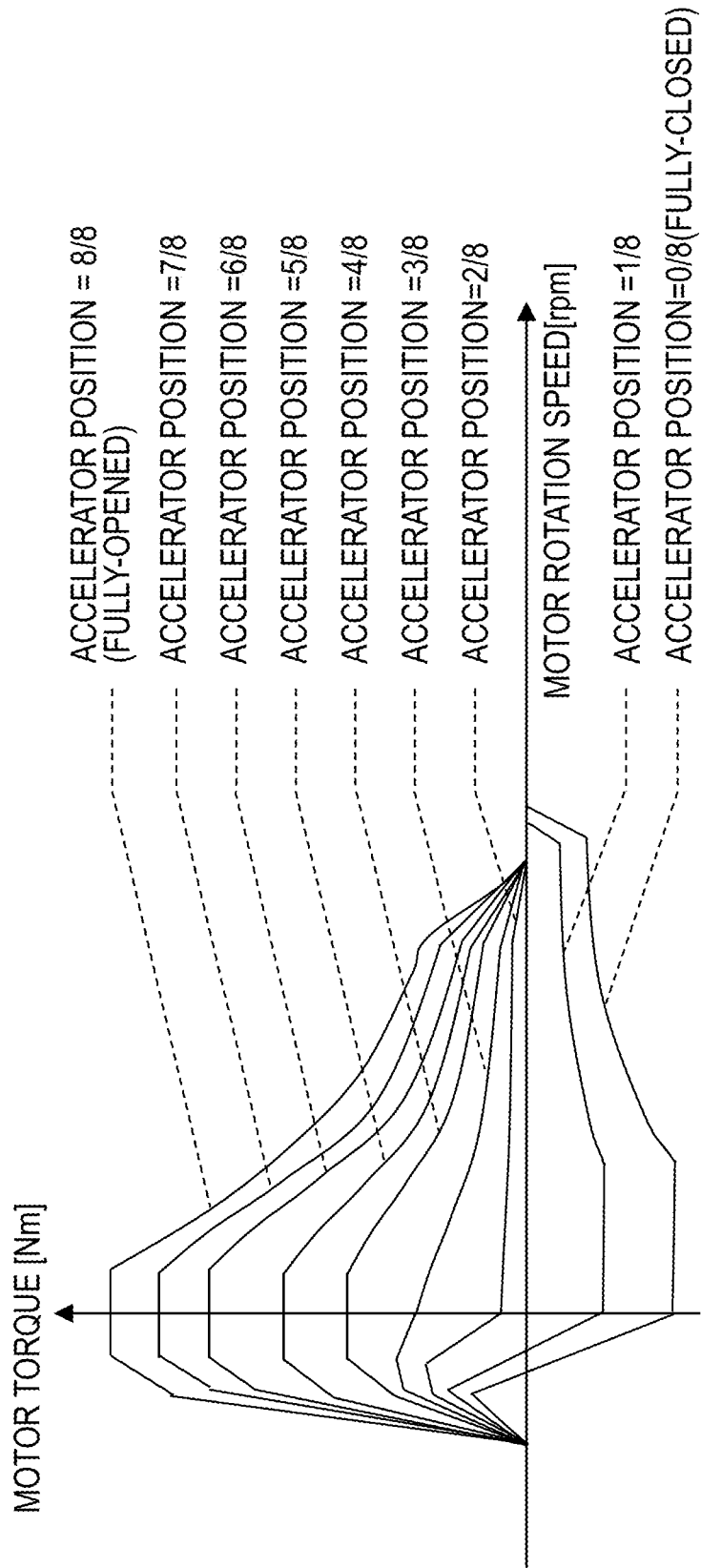
FIG. 3 is a diagram illustrating an example of an accelerator position (accelerator opening degree)-torque table.

In Step S202, the motor controller 2 sets a first torque target value Tm1*. Specifically, the first torque target value Tm1* is set on the basis of the accelerator position AP input in Step S201 and the motor rotation speed ωm by referring to an accelerator position-torque table illustrated in FIG. 3. Note that, the accelerator position-torque table is not limited to the table illustrated in FIG. 3.

In Step S203, the motor controller 2 performs a stop control process to control so as to stop the electric vehicle. Specifically, whether the electric vehicle is just before the stop of the vehicle is determined. The first torque target value Tm1* calculated in Step S202 is set as a third torque target value Tm3* before the electric vehicle is just before the stop of the vehicle, and a second torque target value Tm2*, which converges to a disturbance torque estimated value $T_d$ described later, with a reduction in the motor rotation speed is set as the third torque target value Tm3* after the electric vehicle is just before the stop of the vehicle. This second torque target value Tm2* is a positive torque on the uphill road, a negative torque on the downhill road, and almost 0 on the flat road. This can maintain the vehicle stop state regardless of the gradient of the road surface. In the vehicle stop state, the third torque target value Tm3* matches the disturbance torque estimated value $T_d$ (Tm3*=$T_d$). The detail of the stop control process is described later.

In Step S204, the motor controller 2 performs a switching process that is a distinctive process in the present invention. In the switching process, a switching flag is confirmed. When the switching flag is 1, a process that switches means that holds the vehicle stop state from the motor torque of the motor 4 to a friction braking amount of the friction brakes 12 is performed. On the other hand, when the switching flag is 0, the vehicle stop state by the motor torque is held.

As described above, after the vehicle stops in the stop control process in Step S203, in order to hold the vehicle stop state of the vehicle by the motor torque, it is necessary to continue to maintain the state where this motor torque matches the disturbance torque estimated value $T_d$. Therefore, when the disturbance torque estimated value $T_d$ is not 0, for example, when a vehicle stop position of the vehicle is a slope road, it is necessary to continue to supply the current to the motor during holding the vehicle stop, thus deteriorating the electricity efficiency. The switching process in Step S204 has an object that switches the means that holds the vehicle stop state from the motor 4 to the friction brakes 12 to reduce the current consumed by the motor 4 to hold the vehicle stop, thus improving the electricity cost of the vehicle.

Specifically, the motor controller 2 causes a friction-braking-amount command value $T_b^*$ output to the brake controller 11 to converge to a value equal to or more than an absolute value of the disturbance torque command value $T_d$, and causes a motor torque command value Tm* to converge to 0. The detail of the switching process is described later.

In Step S205, a d-axis current target value id* and a q-axis current target value iq* are obtained on the basis of the motor torque command value Tm* calculated in Step S204, the motor rotation speed em, and the direct-current voltage value $V_{dc}$. For example, a table defining a relationship of the d-axis current target value and the q-axis current target value with the motor torque command value, the motor rotation speed, and the direct-current voltage value is prepared in advance and the d-axis current target value id* and the q-axis current target value iq* are obtained by referring to this table.

In Step S206, a current control is performed to match a d-axis current id and a q-axis current iq with the d-axis current target value id* and the q-axis current target value iq* obtained in Step S205, respectively. To this end, the d-axis current id and the q-axis current iq are first obtained on the basis of the three-phase alternating current values iu, iv and iw and the rotator phase α of the motor 4 input in Step S201. Subsequently, d-axis and q-axis voltage command values vd and vq are calculated from deviations between the d-axis and q-axis current command values id* and iq* and the d-axis and q-axis currents id and iq. It should be noted that a non-interference voltage necessary to cancel out an interference voltage between d-q orthogonal coordinate axes may be added to the calculated d-axis and q-axis voltage command values vd and vq.

Subsequently, from the d-axis and q-axis voltage command values vd and vq and the rotator phase α of the motor 4, the three-phase alternating-current voltage command values vu, vv, and vw are obtained. From the obtained three-phase alternating-current voltage command values vu, vv, and vw and the direct-current voltage value $V_{dc}$, PWM signals tu (%), tv (%), and tw (%) are obtained. By opening and closing the switching elements of the inverter 3 by the PWM signals tu, tv and tw obtained in this way, the motor 4 can be driven with a desired torque instructed by the motor torque command value Tm*.

Here, before the stop control process performed in Step S203 is described, a transfer characteristic $G_p(s)$ from the motor torque Tm until the motor rotation speed ωm in the control device for the electric vehicle according to the embodiment is described.

Figure 4:
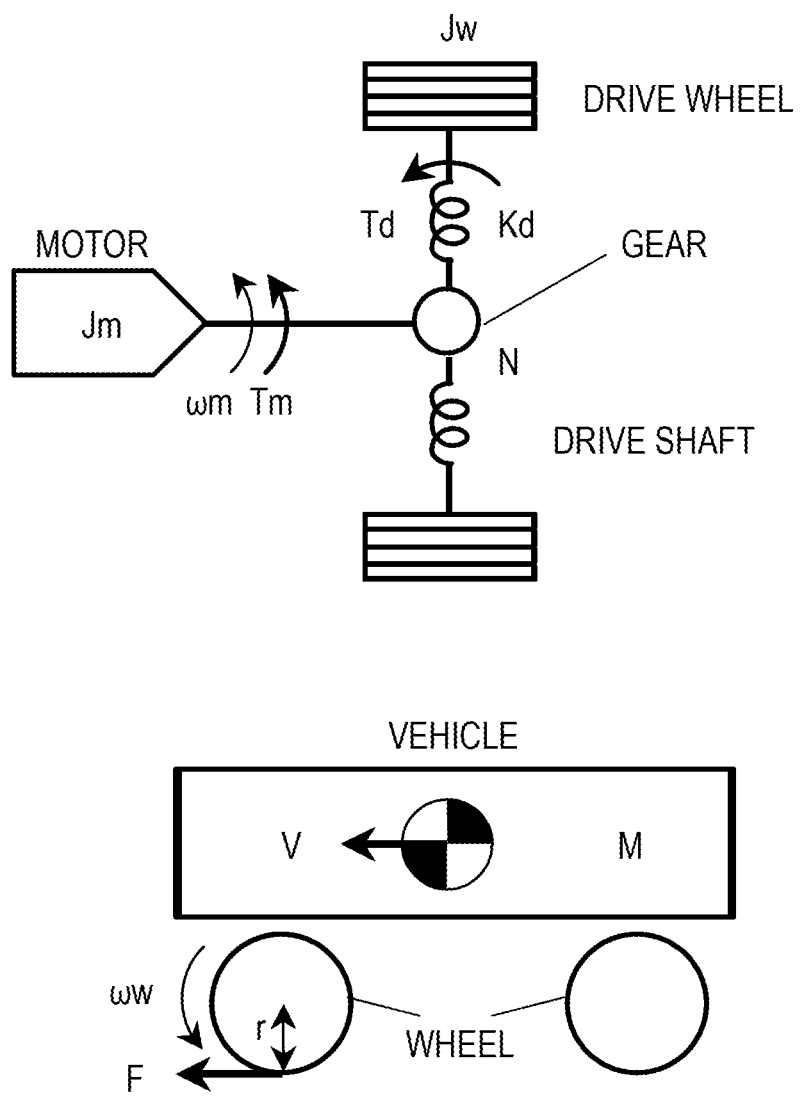
FIG. 4 is a diagram modeling a drive force transmission system of the vehicle.

FIG. 4 is a diagram modeling a drive force transmission system of the vehicle, and respective parameters in the diagram are as described below.
$J_m$: inertia of electric motor
$J_w$: inertia of drive wheels
M: weight of vehicle
$K_d$: torsional rigidity of drive system
$K_t$: coefficient relating to friction between tires and road surface
N: overall gear ratio
r: load radius of tires
$\omega_m$: motor rotation speed $T_m$: torque target value Tm*
$T_d$: torque of drive wheels
F: force applied to vehicle
V: speed of vehicle
$\omega_w$: angular velocity of drive wheels
$T_b$: friction braking amount (motor axis conversion torque) (≥0)

The following equations of motion can be derived from FIG. 4.

[Equation 1]
$$J_m \cdot \omega_m^* = T_m - T_d/N \quad (1)$$

[Equation 2]
$$2J_w \cdot \omega_w^* = T_d - rF \pm N \cdot T_b \quad (2)$$

[Equation 3]
$$M \cdot V^* = F \quad (3)$$

[Equation 4]
$$T_d = K_d \int (\omega_m/N - \omega_w) dt \quad (4)$$

[Equation 5]
$$F = K_t(r\omega_w - V) \quad (5)$$

Note that, the asterisk (*) attached to the right-upper corner of a symbol in the Equations (1) to (3) indicates a time differential. For ± in Equation (2), for convenience, + is used on the uphill road and the flat road, and − is used on the downhill road.

To obtain the transfer characteristic Gp(s) from the torque target value Tm of the motor 4 until the motor rotation speed ωm on the basis of the equations of motion shown in Equations (1) to (5), the transfer characteristic Gp(s) is each expressed by the following Equation (6).

[Equation 6]
$$G_p(s) = \frac{b_3 s^3 + b_2 s^2 + b_1 s + b_0}{s(a_4 s^3 + a_3 s^2 + a_2 s + a_1)} \quad (6)$$

Here, each parameter in Equation (6) is expressed by the following Equation (7).

[Equation 7]
$$a_4 = 2J_m J_w M$$
$$a_3 = J_m(2J_w + Mr^2)K_t$$
$$a_2 = (J_m + 2J_w/N^2)M \cdot K_d$$
$$a_1 = (J_m + 2J_w/N^2 + Mr^2/N^2)K_d \cdot K_t$$
$$b_3 = 2J_w \cdot M$$
$$b_2 = (2J_w + Mr^2)K_t$$
$$b_1 = M \cdot K_d$$
$$b_0 = K_d \cdot K_t \quad (7)$$

Through examinations, the poles and 0 points of a transfer function shown in Equation (6) can be approximated to a transfer function of the following Equation (8), and one pole and one 0 points indicate values extremely close to each other. This is equivalent to that α and β of the following Equation (8) indicate values extremely close to each other.

[Equation 8]

$$G_p(s) = \frac{(s+\beta)(b_2's^2 + b_1's + b_0')}{s(s+\alpha)(a_3's^2 + a_2's + a_1')} \qquad (8)$$

Accordingly, by performing pole-zero cancellation (approximation to α=β) in Equation (8), $G_p(s)$ constitutes a transfer characteristic of (second order)/(third order) as shown in the following Equation (9).

[Equation 9]

$$G_p(s) = \frac{(b_2's^2 + b_1's + b_0')}{s(a_3's^2 + a_2's + a_1')} \cdot \frac{\beta}{\alpha} \qquad (9)$$

The following describes a transmission characteristics $G_{pa}(s)$ from the motor torque Tm until a vehicle longitudinal acceleration α, and a transmission characteristics $G_{ba}(s)$ from the friction braking amount $T_b$ until the vehicle longitudinal acceleration α, in the control device for the electric vehicle according to the embodiment.

When the transmission characteristics $G_{pa}(s)$ and $G_{ba}(S)$ are obtained on the basis of the above-described equations of motion (1) to (5), the transmission characteristics $G_{pa}(s)$ and $G_{ba}(s)$ can be expressed by the following Equations (9) and (10).

[Equation 10]

$$G_{pa}(s) = \frac{b_{0a}}{(a_4 s^3 + a_3 s^2 + a_2 s + a_1)} \qquad (10)$$

[Equation 11]

$$G_{ba}(s) = \frac{\pm(b_{2a} s^2 + b_{0a})}{(a_4 s^3 + a_3 s^2 + a_2 s + a_1)} \qquad (11)$$

Here, each parameter in Equations (10) and (11) is expressed by the following Equation (12). It should be noted that, for ± in Equation (11), for convenience, + is used on the uphill road and the flat road, and − is used on the downhill road.

[Equation 12]

$b_{0a} = r/N \cdot KD \cdot Kt$ $b_{2a} = J_m \cdot r \cdot K_t \cdot N$ (12)

<Stop Control Process>

Next, the detail of the stop control process performed in Step S203 in the flowchart of FIG. 2 is described.

Figure 5:
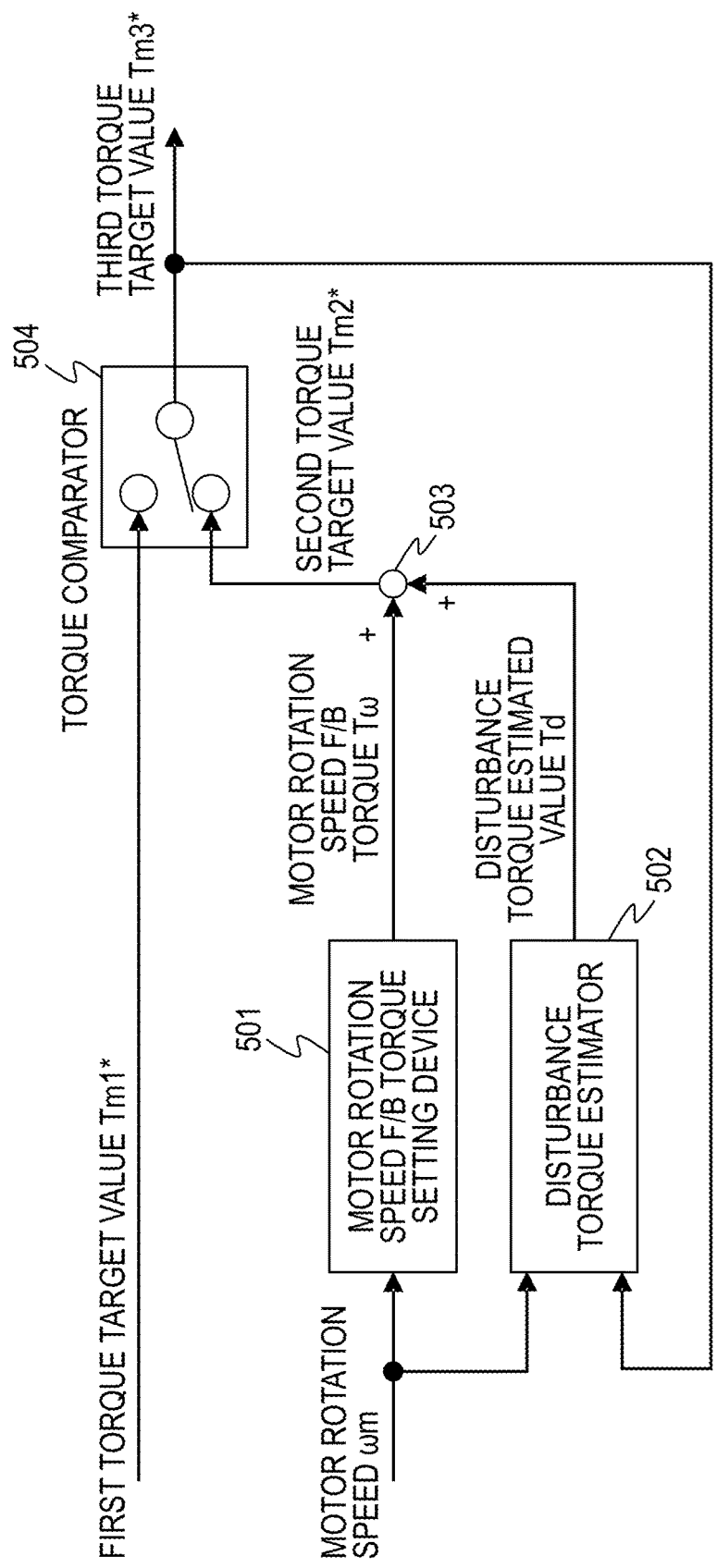
FIG. 5 is a block diagram for achieving a stop control process.

FIG. 5 is a block diagram for achieving the stop control process. The stop control process is performed using a motor rotation speed F/B torque setting device 501, a disturbance torque estimator 502, an adder 503, and a torque comparator 504. The following describes the respective configurations in detail.

The motor rotation speed F/B torque setting device 501 calculates a motor rotation speed feedback torque (hereinafter referred to as a motor rotation speed F/B torque) Tω on the basis of the detected motor rotation speed ωm. The detail will be described with reference to FIG. 6.

Figure 6:
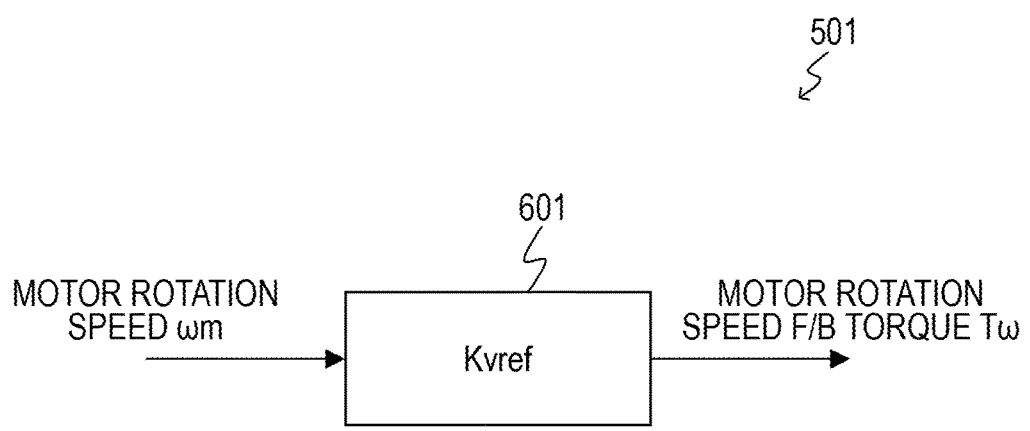
FIG. 6 is a diagram describing a method for calculating a motor rotation speed F/B torque on the basis of a motor rotation speed.

FIG. 6 is a diagram describing a method for calculating the motor rotation speed F/B torque Tω on the basis of the motor rotation speed cam. The motor rotation speed F/B torque setting device 501 includes a multiplier 601 and calculates the motor rotation speed F/B torque Tω by multiplying the motor rotation speed ωm by a gain Kvref. However, Kvref is a negative (minus) value necessary to stop the electric vehicle just before the electric vehicle stops, and appropriately set, for example, from experimental data or similar data. The motor rotation speed F/B torque Tω is set as a torque capable of obtaining a larger braking force as the motor rotation speed ωm increases.

It should be noted that, although the motor rotation speed F/B torque setting device 501 is described to calculate the motor rotation speed F/B torque Tω by multiplying the motor rotation speed ωm by the gain Kvref, the motor rotation speed F/B torque Tω may be calculated using, for example, a regenerative torque table defining a regenerative torque with respect to the motor rotation speed ωm and an attenuation rate table storing an attenuation rate of the motor rotation speed ωm in advance.

The disturbance torque estimator 502 illustrated in FIG. 5 calculates the disturbance torque estimated value $T_d$ on the basis of the detected motor rotation speed ωm and the third torque target value Tm3*. The detail will be described with reference to FIG. 7.

Figure 7:
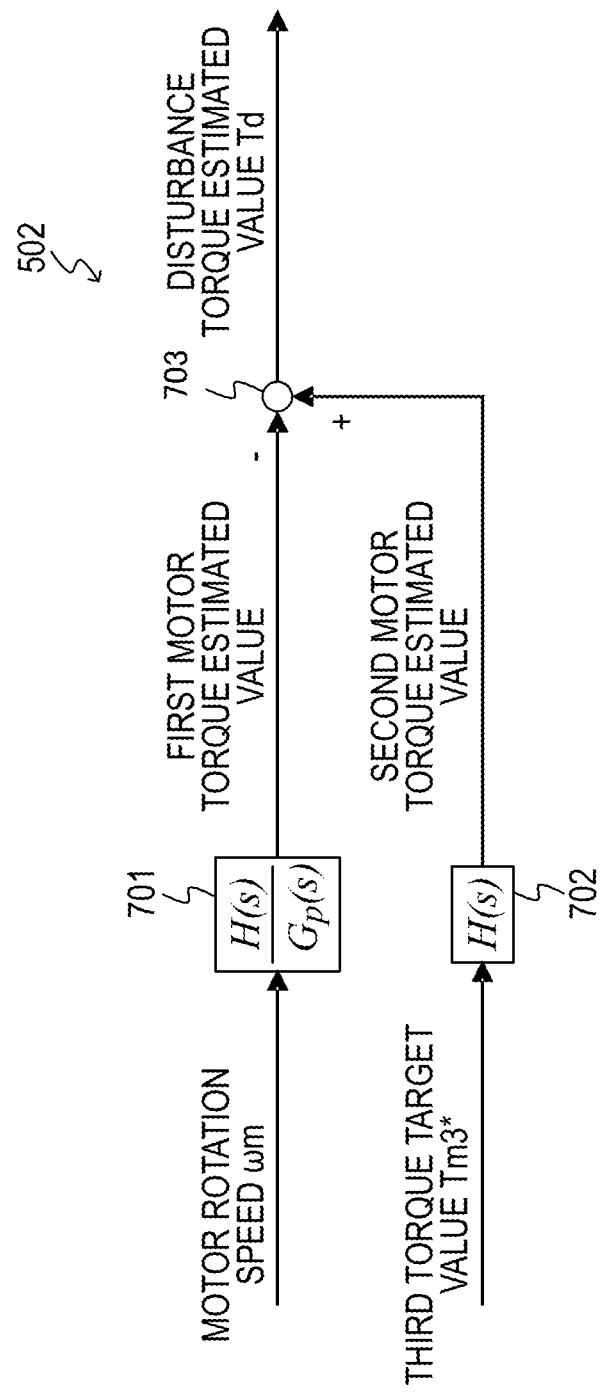
FIG. 7 is a block diagram describing a method for calculating a disturbance torque estimated value on the basis of the motor rotation speed and a third torque target value.

FIG. 7 is a block diagram describing a method for calculating the disturbance torque estimated value $T_d$ on the basis of the motor rotation speed ωm and the third torque target value Tm3*. The disturbance torque estimator 502 includes a control block 701, a control block 702, and a subtractor 703.

The control block 701 functions as a filter having a transfer characteristic H(s)/Gp(s) and performs a filtering process with respect to the motor rotation speed ωm, thus calculating a first motor torque estimated value. H(s) is a low-pass filter having a transfer characteristic such that a difference between the denominator degree and the numerator degree is equal to or more than a difference between the denominator degree and the numerator degree of the model $G_p(s)$ (see Equitation (9)).

The control block 702 functions as a low-pass filter having a transfer characteristic H(s) and performs the filtering process with respect to the third torque target value Tm3*, thus calculating a second motor torque estimated value.

Then, the subtractor 703 subtracts the first motor torque estimated value from the second motor torque estimated value to calculate the disturbance torque estimated value $T_d$.

It should be noted that although the disturbance torque according the embodiment is estimated by a disturbance observer as illustrated in FIG. 7, it may be estimated using a meter such as a vehicle longitudinal G sensor.

Here, while an air resistance, a modeling error caused by a variation of the vehicle weight due to the number of passengers and load capacity, a rolling resistance of the tires, a gradient resistance of the road surface, and a similar resistance are thought as the disturbances that are targets of this embodiment, a disturbance factor dominant just before the stop of the vehicle is the gradient resistance. While the disturbance factors differ depending on driving conditions, the disturbance factors described above can be collectively estimated since the disturbance torque estimator 502 calculates the disturbance torque estimated value $T_d$ on the basis of the third torque target value Tm3*, the motor rotation speed ωm, and the vehicle model $G_p(s)$. This achieves a smooth vehicle stop from deceleration under any driving condition.

Returning to FIG. 5, the explanation will be continued. The adder 503 adds the motor rotation speed F/B torque Tω calculated by the motor rotation speed F/B torque setting device 501 to the disturbance torque estimated value $T_d$ calculated by the disturbance torque estimator 502 to calculate the second torque target value Tm2*. When the motor rotation speed ωm decreases and approaches 0, the motor rotation speed F/B torque Tω also approaches 0. Accordingly, the second torque target value Tm2* converges to the disturbance torque estimated value $T_d$ according to the reduction in the motor rotation speed ωm.

The torque comparator 504 compares the magnitudes of the first torque target value Tm1* with the second torque target value Tm2* and sets the larger torque target value as the third torque target value Tm3*. The second torque target value Tm2* is smaller than the first torque target value Tm1* during the travel of the vehicle. When the vehicle decelerates and reaches just before the stop of the vehicle (the vehicle speed is equal to or less than a predetermined vehicle speed), the second torque target value Tm2* becomes larger than the first torque target value Tm1*. Thus, when the first torque target value Tm1* is larger than the second torque target value Tm2*, the torque comparator 504 determines that the vehicle is prior to just before the stop of the vehicle and sets the first torque target value Tm1* as the third torque target value Tm3*. Further, when the second torque target value Tm2* becomes larger than the first torque target value Tm1*, the torque comparator 504 determines that the vehicle is just before the stop of the vehicle and switches the third torque target value Tm3* from the first torque target value Tm1* to the second torque target value Tm2*.

It should be noted that, in order to maintain the vehicle stop state, the second torque target value Tm2* converges to the positive torque on the uphill road, the negative torque on the downhill road, and almost 0 on the flat road.

The detail of the stop control process is as described above. By performing such process, regardless of the gradient on the road surface where the vehicle is running, the vehicle can smoothly stop only by the motor torque to hold the vehicle stop state.

Here, although the motor torque alone can continue to hold the vehicle stop state of the vehicle that has smoothly stopped only by the motor torque by the stop control process, as described above, it is more preferable from the aspect of the electricity cost to hold the vehicle stop state by the friction braking force of the friction brakes 12 whose current consumption is less. The following describes the detail of the switching process that is the distinctive process of the present invention. The switching process switches the means that holds the vehicle stop state from the motor 4 to the friction brakes 12.

<Switching Process>

Figure 8:
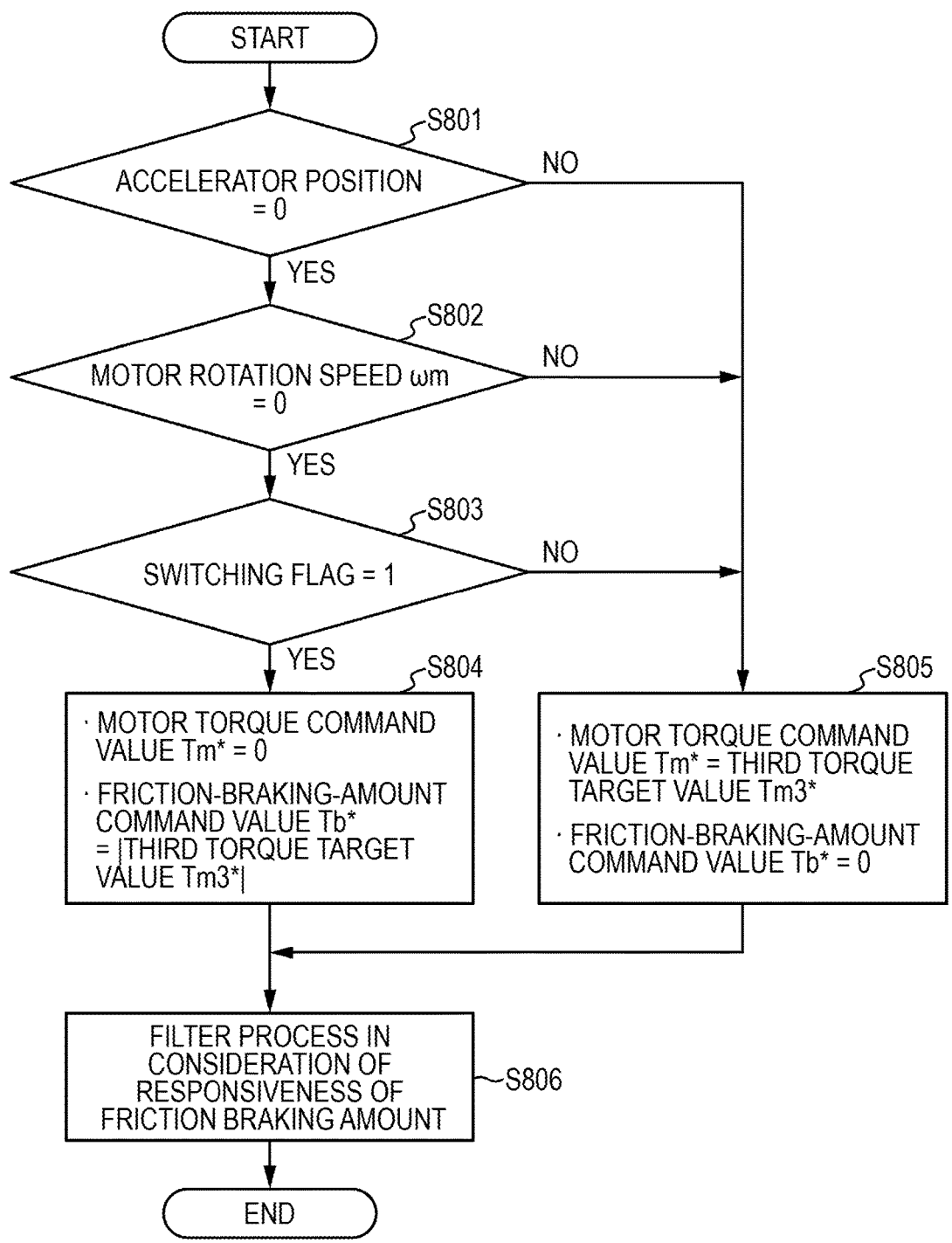
FIG. 8 is a flowchart showing a flow of a switching process according to the first embodiment.

FIG. 8 is a flowchart showing a flow of the switching process performed in Step S204 in FIG. 2, in this embodiment.

In Step S801, the motor controller 2 determines whether the accelerator position is 0 or not to determine that the driver has an intention of start. When the accelerator position is 0, the motor controller 2 determines that the driver has no intention of start to perform a process in subsequent Step S802. When the accelerator position is not 0, the motor controller 2 determines that the driver has the start intention to perform a process in Step S805.

In Step S802, the motor controller 2 determines whether the motor rotation speed ωm is 0 or not to confirm whether the vehicle is in the vehicle stop state or not. When the motor rotation speed ωm is 0, the motor controller 2 determines that the vehicle is in the vehicle stop state to perform a process in subsequent Step S803. When the motor rotation speed ωm is not 0, the motor controller 2 determines that the vehicle is in a running state to perform the process in Step S805.

It should be noted that the motor rotation speed ωm that will be an index to determine the vehicle stop state is not necessarily 0, and may be a predetermined extremely small value. This predetermined value is, for example, a value acceptable from the aspect of the electricity cost, even holding the vehicle stop state of the vehicle by the motor torque.

In Step S803, the means that holds the vehicle stop state is determined. When the switching flag is 1, it is determined that the friction brakes 12 perform vehicle stop holding to perform a process in Step S804. When the switching flag is 0, it is determined that the motor 4 performs the vehicle stop holding to perform the process in Step S805.

This process can continue to hold the vehicle stop state by the motor 4 depending on a parameter (hereinafter simply referred to as the vehicle state) that is an index showing the vehicle state and is different from the motor rotation speed ωm, not uniformly switching the vehicle stop holding means from the motor 4 to the friction brakes 12 when the motor rotation speed ωm becomes almost 0. This can make a start frequency from the vehicle stop holding state by the friction brakes 12 a necessary minimum. The vehicle state considered by this process, and the setting of the switching flag will be described later with reference to FIG. 10.

In Step S804, since the driver has no start intention, the vehicle is in the vehicle stop state, and the switching flag is 1, a process that switches the means that holds the vehicle stop state from the motor torque to the friction brakes is performed. Specifically, the motor controller 2 sets the motor torque command value Tm* to 0, and sets the friction-braking-amount command value $T_b$* as an absolute value of the third torque target value Tm*.

It should be noted that a value to which the motor torque command value Tm* converges in this Step is not necessarily 0, and may be an extremely small value, for example, about 1 to 2N, that is acceptable from the aspect of the electricity cost. Such a value ensures faster transition to the running state when the friction braking amount is released to start the vehicle from the stop state.

As described above, since the third torque target value Tm* is a value that matches the disturbance torque estimated value $T_d$ in the vehicle stop state, the friction-braking-amount command value $T_b$* is balanced with the disturbance torque estimated value $T_d$, and is a command value that causes the friction brakes 12 to output the friction braking amount that can hold the vehicle stop state of the vehicle via the brake controller 11. This can switch the means that holds the vehicle stop state from the motor 4 to the friction brakes 12, and hold the vehicle stop state of the vehicle.

It should be noted that, at this time, the value to which the friction-braking-amount command value $T_b$* converges may be equal to or more than an absolute value of a difference between the disturbance torque estimated value $T_d$ and the motor torque command value Tm* ($T_b$*≥|$T_d$−Tm*|). This can secure a robustness with respect to dispersion of the friction braking amount caused by, for example, a wear status of the friction brakes 12 and a change in oil viscosity by the temperature to hold the vehicle stop state without rolling back/rolling forward of the vehicle.

On the other hand, in Step S805, since the driver has the start intention, the vehicle is in the running state, or the switching flag is 0, the motor torque command value Tm* is set to the value of the third torque target value Tm3*, and the friction-braking-amount command value $T_b^*$ is set to 0. That is, there is no intervention from the friction brakes 12, and the vehicle is configured to run by the motor torque.

In subsequent Step S806, the motor controller 2 performs a filter process in consideration of the responsiveness of the friction braking amount, on the motor torque command value Tm*.

In this process, the filter process for adjusting a rate of change when the motor torque command value Tm* is caused to converge to the value (0 or the third torque target value Tm3*) set in Step S804 and Step S805, considering the responsiveness of the friction braking amount is performed. By performing such process, even when the means that holds the vehicle stop state is switched between the motor torque and the friction braking amount, a vehicle stop holding force as the vehicle can be constantly kept. A description will be specifically given by referring to FIG. 9.

Figure 9:
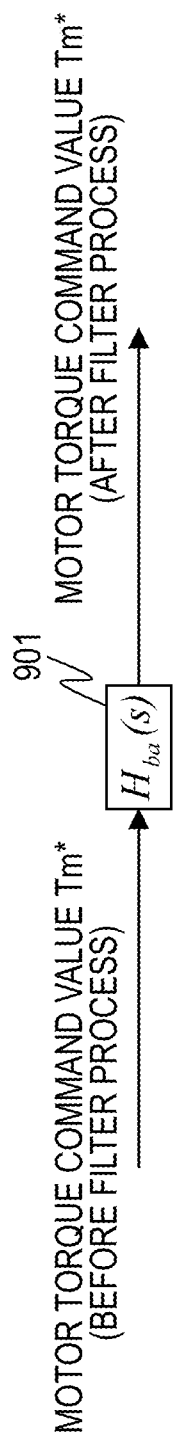
FIG. 9 is a diagram describing a method for performing a filter process in consideration of a responsiveness of a friction braking amount, on a motor torque command value.

FIG. 9 is a block diagram describing the filter process in consideration of the responsiveness of the friction braking amount performed on the motor torque command value Tm*.

In Step S806, a filter $H_{ba}(s)$ expressed by the following Equation (13) is performed on the motor torque command value Tm* to calculate the motor torque command value Tm* after the filter process.

[Equation 13]

$$H_{ba}(s) = \frac{G_{ba}(s)}{G_{pa}(s) \cdot H_{brk}(s)} \quad (13)$$

Here, $H_{brk}(s)$ in Equation (13) is expressed by the following Equation (14).

[Equation 14]

$$H_{brk}(s) = \frac{1}{\tau_b^* s + 1} \quad (14)$$

An actuator response delay of the friction brakes 12 is represented by τb in Equation (14).

In Step S806, such that the filter process by the filter $H_{ba}(s)$ expressed by Equation (13) is performed on the motor torque command value Tm*, the motor torque command value Tm* in consideration of the response delay of the friction braking amount of the friction brakes 12 with respect to the friction-braking-amount command value can be calculated. This can constantly keep the vehicle stop holding force that acts on the actual vehicle even in a switching timing between the motor torque and the friction braking force by the friction brakes 12.

The switching process according to Step S204 terminates as described above. Then, in the processes from Step S205 illustrated in FIG. 2, on the basis of the motor torque command value Tm* and the friction-braking-amount command value $T_b^*$ obtained in Step S204, the motor 4 and the friction brakes 12 are controlled.

Figure 10:
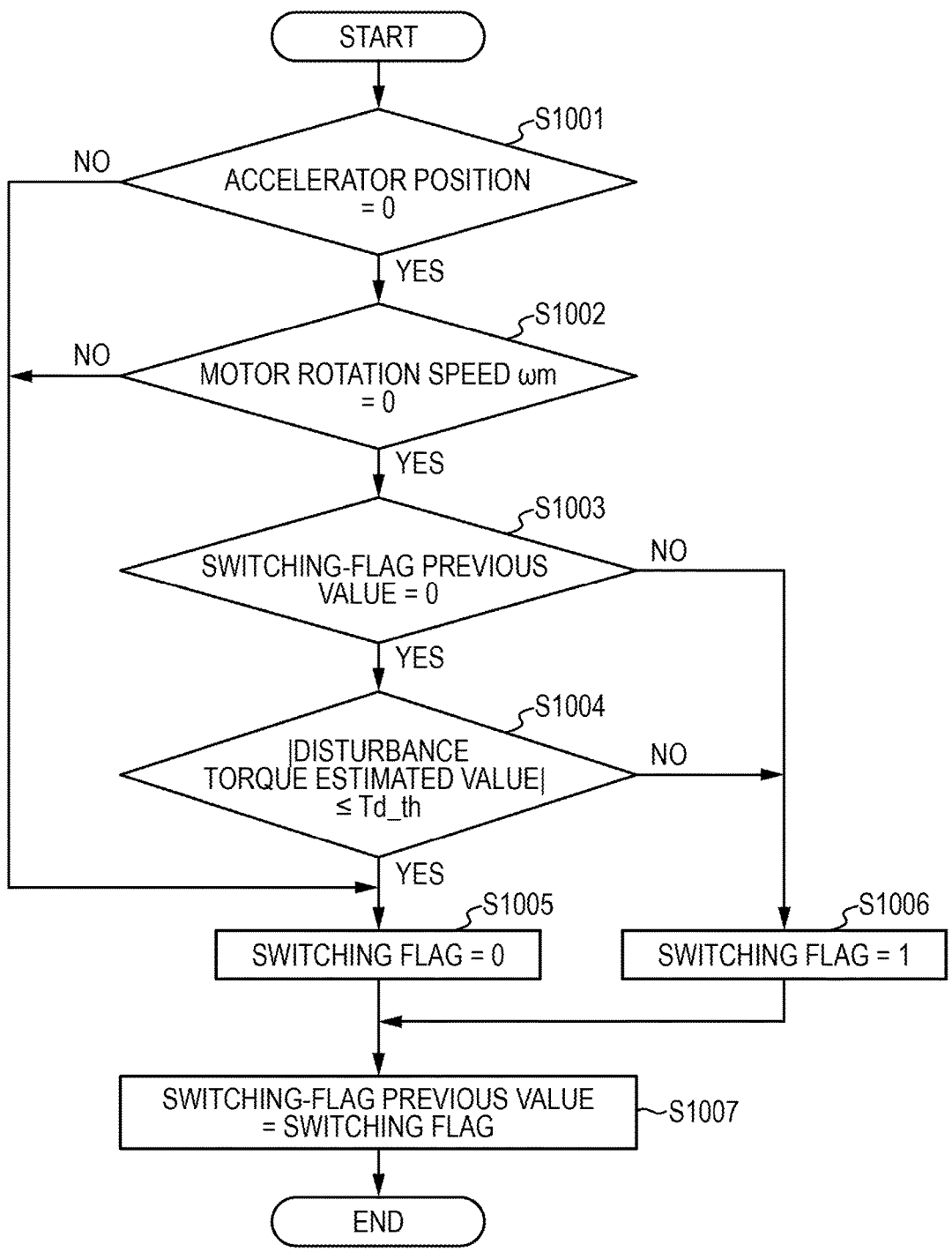
FIG. 10 is a flowchart showing a flow of a switching flag setting according to the first embodiment.

Subsequently, the switching flag determined in S803 will be described with reference to FIG. 10. FIG. 10 is a flowchart showing a flow of the switching flag setting.

In Step S1001, the motor controller 2 determines whether the accelerator position is 0 or not to determine the start intention of the driver. When the accelerator position is 0, the motor controller 2 determines that the driver has no start intention to perform a process in subsequent Step S1002. When the accelerator position is not 0, the motor controller 2 determines that the driver has the start intention to perform a process in Step S1005.

In Step S1002, the motor controller 2 determines whether the motor rotation speed ωm is 0 or not to confirm whether the vehicle is in the vehicle stop state or not. When the motor rotation speed ωm is 0, the motor controller 2 determines that the vehicle is in the vehicle stop state to perform a process in subsequent Step S1003. When the motor rotation speed ωm is not 0, the motor controller 2 determines that the vehicle is in the running state to perform the process in Step S1005.

In Step S1003, the motor controller 2 determines whether a switching-flag previous value is 0 or 1. When the switching-flag previous value is 0, the motor controller 2 performs a process in Step S1004 in order to determine whether the vehicle stop holding means is switched from the motor torque to the friction braking force of the friction brakes 12 or not. When the switching-flag previous value is 1, the motor controller 2 performs a process in Step S1006 in order to hold the vehicle stop state by the friction brakes 12. This process maintains the vehicle stop holding state by the friction brakes 12 until the start, after the vehicle stop holding means is switched from the motor torque to the friction brakes 12. In other words, after the stop control in Step S203 performs a control such that the motor torque converges to the disturbance torque estimated value, after the vehicle stop holding means is switched from the motor torque to the friction brakes 12, the vehicle stop holding state by the friction brakes 12 is maintained until the accelerator position has increased. This can avoid, for example, occurrence of sound and increase of processing load caused by frequent switching of the vehicle stop holding means.

In Step S1004, the motor controller 2 determines whether the absolute value of the disturbance torque estimated value as an index showing the vehicle state is equal to or less than a threshold value Td_th or not. When the absolute value of the disturbance torque estimated value is equal to or less than the threshold value Td_th, the motor controller 2 determines that the gradient is small, or the vehicle is on the flat road to perform the process in Step S1005. When the absolute value of the disturbance torque estimated value is greater than the threshold value Td_th, the motor controller 2 determines that the gradient is large to perform the process in Step S1006.

Here, a description will be given of the threshold value Td_th. As described above, the friction braking amount for performing the vehicle stop holding is determined on the basis of the disturbance torque estimated value. The disturbance torque estimated value considers not only the gradient resistance but also friction resistance on the road surface and resistance component by friction of the motor as the disturbance, thus having a value even on the flat road. However, on the flat road, it is not necessity to perform the vehicle stop holding by the friction brakes 12. For example, insofar as the gradient is about 1 to 2%, it is acceptable from the aspect of the electricity cost even if the vehicle stop state of the vehicle is held by the motor torque. Thus, when the startability is prioritized, it is preferable that the vehicle stop holding is performed by the motor torque.

Accordingly, the disturbance torque estimated value for determining to be on the flat road, or for determining to be on a gradient to the extent that an electricity-cost improving effect is not expected is set as the threshold value Td_th according to the embodiment. This ensures a smooth start by the motor torque switching since unnecessary switching to the friction brakes on the flat road or the small gradient does not occur.

In Step S1005, the motor controller 2 sets the switching flag to 0 since it is on the flat road or the small gradient road, thus eliminating the need for the switching to the friction brakes from the aspect of the startability.

In Step S1006, the motor controller 2 sets the switching flag to 1 since the gradient is large to require the switching to the friction braking from the aspect of the electricity cost.

In Step S1007, the motor controller 2 stores the switching flag set in Step S1005 or Step S1006 in the switching-flag previous value.

The following describes effects when the control device according to the one embodiment described up to the present is applied to the electric vehicle with reference to FIGS. 11 and 12.

Figure 11A:
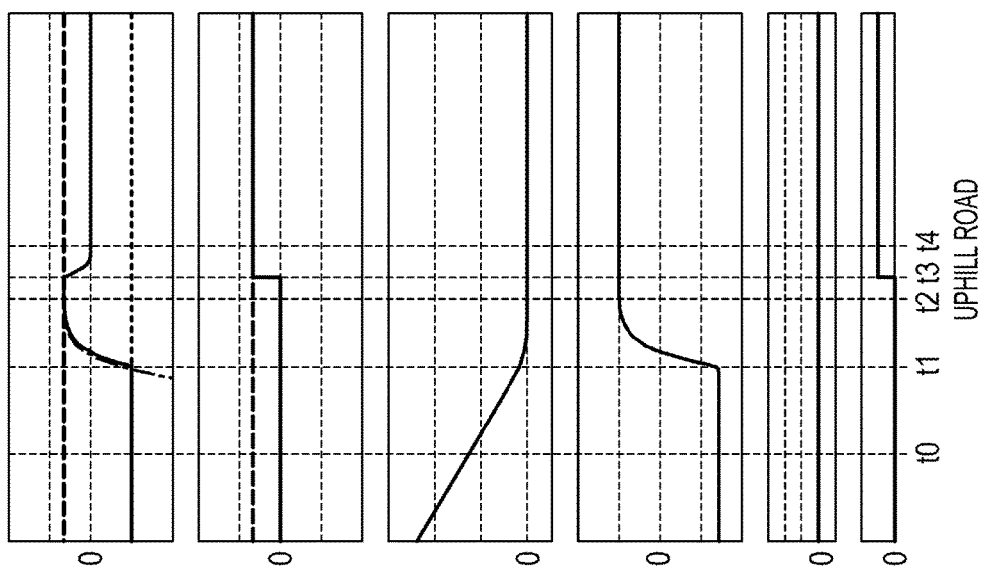
FIG. 11 is a diagram describing a control result by the control device for the electric vehicle according to the first embodiment.
Figure 11B:
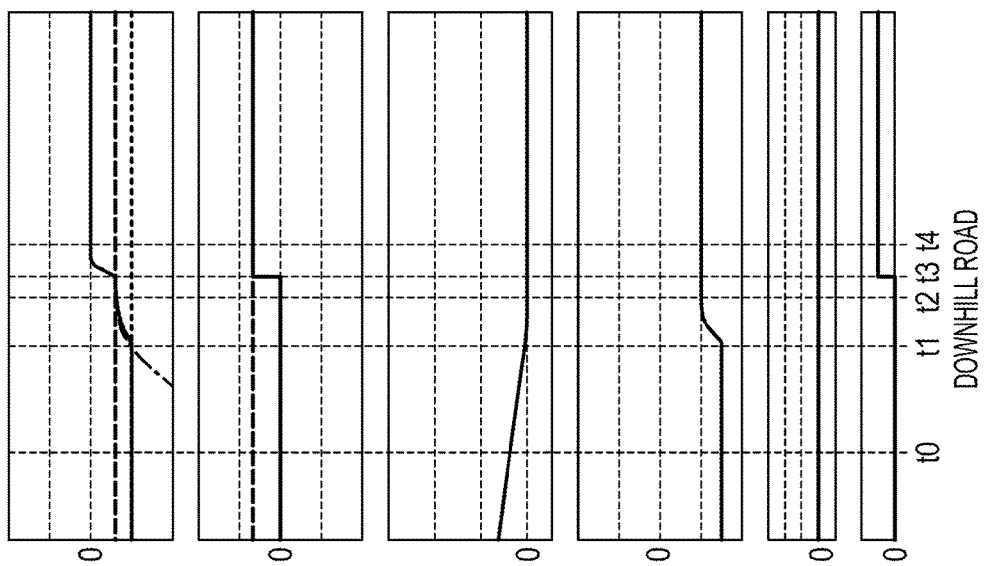

FIG. 11 and FIG. 12 are timing charts showing control results when the control device in this embodiment is applied to the electric vehicle. FIG. 11(a) and FIG. 12(a) show the control result on the downhill road, and FIG. 11(b) and FIG. 12(b) show the control result on the uphill road. FIG. 11 and FIG. 12 show, with respect to the time expressed by the horizontal axis, from the top, the motor torque command value, the friction-braking-amount command value, the motor rotation speed, the vehicle-longitudinal-acceleration sensor detected value, the accelerator position, and the switching flag.

In a chart representing the motor torque command value, the solid line indicates the motor torque command value, the dashed line indicates the disturbance torque estimated value, the dotted line indicates the first torque target value, and the one dot chain line indicates the second torque target value. In a chart representing the friction-braking-amount command value, the solid line indicates the friction-braking-force command value, and the dashed line indicates the disturbance torque estimated value.

FIGS. 11(a) and (b) are timing charts showing a scene where the vehicle stop holding means is switched from the motor 4 to the friction brakes 12 after the vehicle smoothly stops by the motor torque, by the stop control process.

At a time t0, the motor 4 is controlled on the basis of the first torque target value Tm1* calculated in Step S202 to decelerate the vehicle.

At a time t1, such that the torque comparator 504 illustrated in FIG. 5 determines that it is just before stop of the vehicle, the motor torque command value Tm* is switched from the first torque target value Tm1* to the second torque target value Tm2*.

At a time t2, regardless of the gradient, the motor torque command value Tm* converges to the disturbance torque estimated value $T_d$, and the motor rotation speed ωm is asymptotically converging to 0. Thus, the vehicle smoothly stops without the acceleration vibration. Then, the vehicle stop state is held only by the motor torque.

At a time t3, the accelerator position is 0 and the motor rotation speed is 0, and further, the switching flag is 1. Thus, the vehicle is determined to be in the vehicle stop state to switch the vehicle stop holding means from the motor 4 to the friction brakes 12. In this respect, the friction-brake-braking-amount command $T_b^*$ converges from 0 to an absolute value $|T_d|$ of the disturbance torque estimated value $T_d$, and the motor torque command value Tm* converges from the value that matches the disturbance torque estimated value $T_d$ to 0 with a rate of change in consideration of the responsiveness of the friction braking amount.

Then, at a time t4, the switching from the motor 4 to the friction brakes 12 completes to hold the vehicle stop state only by the friction brakes 12.

As described above, from the control result illustrated in FIG. 11, it is seen that a turbulence to cause the acceleration vibration does not occur in the vehicle-longitudinal-acceleration sensor detected value when the vehicle stops at the time t2 and in the switching process at the time t3, the vehicle smoothly stops on the downhill road (a) or the uphill road (b), and the vehicle stop holding force as the vehicle can be constantly kept even when the vehicle stop holding means is switched.

FIGS. 12(a) and (b) are timing charts showing from a state where the vehicle stop state of the vehicle is held by the braking force by the friction brakes 12 to a scene where the vehicle starts such that the driver depresses the accelerator pedal.

At the time t0, the vehicle stop state is held by the friction braking amount equivalent to the absolute value $|T_d|$ of the disturbance torque estimated value $T_d$.

At the time t1, such that the driver depresses the accelerator pedal, the first torque target value Tm1* gradually increases. Since the accelerator position increases, it is determined that the driver has the start intention. Thus, the friction-braking-amount command value $T_b^*$ converges from the absolute value $|T_d|$ of the disturbance torque estimated value $T_d$ to 0, and the motor torque command value Tm* converges from 0 to the value that matches the disturbance torque estimated value $T_d$ with the rate of change in consideration of the responsiveness of the friction braking amount. This again switches the vehicle stop holding means from the friction brakes 12 switched from the motor 4, to the motor 4 as a driving source.

At the time t2, since the torque comparator 504 illustrated in FIG. 5 determines that the first torque target value Tm1* is greater than the second torque target value Tm2*, the motor torque command value Tm* is switched from the second torque target value Tm2* to the first torque target value Tm1*.

At the time t3, the vehicle accelerates corresponding to the first torque target value Tm1*.

As described above, from the control result illustrated in FIG. 12, it is seen that the turbulence to cause the acceleration vibration does not occur in the vehicle-longitudinal-acceleration sensor detected value even in the switching from the friction brakes 12 to the motor 4 at the time t1, and the transfer from the vehicle stop state to the running state in accordance with the switching is smoothly performed.

Thus, it is seen that the switching from the motor 4 to the friction brakes 12 can reduce a current consumption quantity in the scene that continues to hold the vehicle stop state on the slope road, and the switching between the motor 4 and the friction brakes 12 can be smoothly performed without the acceleration vibration on the vehicle.

As described above, the control device for electric vehicle in the first embodiment, in the electric vehicle including the motor 4 that functions as the traveling driving source and provides a regenerative braking force to the vehicle, and the friction brakes 12 that provide the friction braking force to the vehicle, detects the motor rotation speed ωm proportionate to a running speed of this electric vehicle, estimates the disturbance torque that acts on the motor 4, and performs the control such that the motor torque command value converges to the disturbance torque estimated value $T_d$ as the motor rotation speed ωm decreases. Then, when the motor rotation speed ωm becomes almost 0, the control device performs the control such that the friction-braking-amount command value with respect to the friction brakes 12 converges to a value determined on the basis of the disturbance torque estimated value $T_d$, and causes the motor torque command value to converge to almost 0. This can reduce the current consumption quantity of the motor 4 while holding the vehicle stop state of the vehicle by the friction braking force, thus improving the electricity cost of the vehicle.

The control device for electric vehicle in the first embodiment causes the friction-braking-amount command value $T_b^*$ with respect to the friction brakes 12 to converge to a value equal to or more than the difference between the disturbance torque estimated value $T_d$ and the motor torque command value Tm*, when the motor rotation speed ωm becomes equal to or less than a predetermined value preliminary determined. This can secure the robustness with respect to the dispersion of the friction braking amount that acts on the drive wheels corresponding to the friction-braking-amount command value $T_b^*$ to hold the vehicle stop state without generating the rolling back/rolling forward of the vehicle.

In the control device for electric vehicle in the first embodiment, the rate of change of the motor torque command value Tm* when this motor torque command value Tm* is caused to converge to the disturbance torque estimated value $T_d$ is adjusted corresponding to the response delay with respect to the friction-braking-amount command value $T_b^*$ of the friction braking amount. This can constantly keep the vehicle stop holding force as the vehicle, even in the switching from the motor 4 to the friction brakes 12. Since a motor current consumption required for constantly keeping the vehicle stop holding force can be reduced to the minimum, the electricity cost can be more improved.

The control device for electric vehicle in the first embodiment causes the motor torque command value Tm* to converge to the third torque target value Tm3*, and causes the friction-braking-amount command value $T_b^*$ to converge to 0, when the electric vehicle starts from the state that holds the vehicle stop state by the friction braking amount. This can smoothly start the vehicle from the vehicle stop state without generating the rolling back/rolling forward of the vehicle.

Furthermore, in the control device for electric vehicle in the first embodiment, the rate of change of the motor torque command value Tm* when this motor torque command value Tm* is caused to converge to the third torque target value Tm3* is adjusted corresponding to the response delay with respect to the friction-braking-amount command value $T_b^*$ of the friction braking amount. This can constantly keep the vehicle stop holding force as the vehicle, even in the switching from the friction brakes 12 to the motor 4. Since the motor current consumption required for constantly keeping the vehicle stop holding force can be reduced to the minimum, the electricity cost can be more improved.

The control device for electric vehicle in the first embodiment performs the control such that the friction braking amount of the friction brakes 12 converges to the value determined on the basis of the disturbance torque estimated value, and causes the motor torque to converge to almost 0, when the motor rotation speed ωm becomes almost 0, and a parameter that is the index showing the vehicle state and different from the motor rotation speed cm is equal to or more than the predetermined value. This can continue to hold the vehicle stop by the motor 4 depending on the scene, not uniformly switching the vehicle stop holding means from the motor 4 to the friction brakes 12 when the motor rotation speed becomes almost 0, thus making a start frequency from the vehicle stop state by the friction brakes 12 a necessary minimum.

The control device for electric vehicle in the first embodiment performs the control such that the friction braking amount of the friction brakes 12 converges to the value determined on the basis of the disturbance torque estimated value, and causes the motor torque to converge to almost 0, when the motor rotation speed ωm becomes almost 0, and the disturbance torque estimated value is equal to or more than the predetermined threshold Td_th. This can avoid the unnecessary switching to the friction brakes 12 on the flat road or the small gradient road to ensure the smooth start from the vehicle stop by the motor torque.

The control device for electric vehicle in the first embodiment detects the accelerator position that is an operation state of the accelerator pedal, and when the control is performed such that the friction braking amount of the friction brakes 12 converges to the value determined on the basis of the disturbance torque estimated value, and the motor torque converges to almost 0, maintains the state where the friction braking amount of the friction brakes 12 has converged to the disturbance torque until the accelerator position has increased. This can prevent the vehicle stop holding means from frequently switching, in the vehicle stop state of the vehicle.

—Second Embodiment—

A control device for electric vehicle in a second embodiment is different from that in the first embodiment, in a setting method of the switching flag. More specifically, the vehicle state considered in the switching flag setting is different. The following mainly describes a difference from the first embodiment, for the control device for electric vehicle in the second embodiment.

Figure 13:
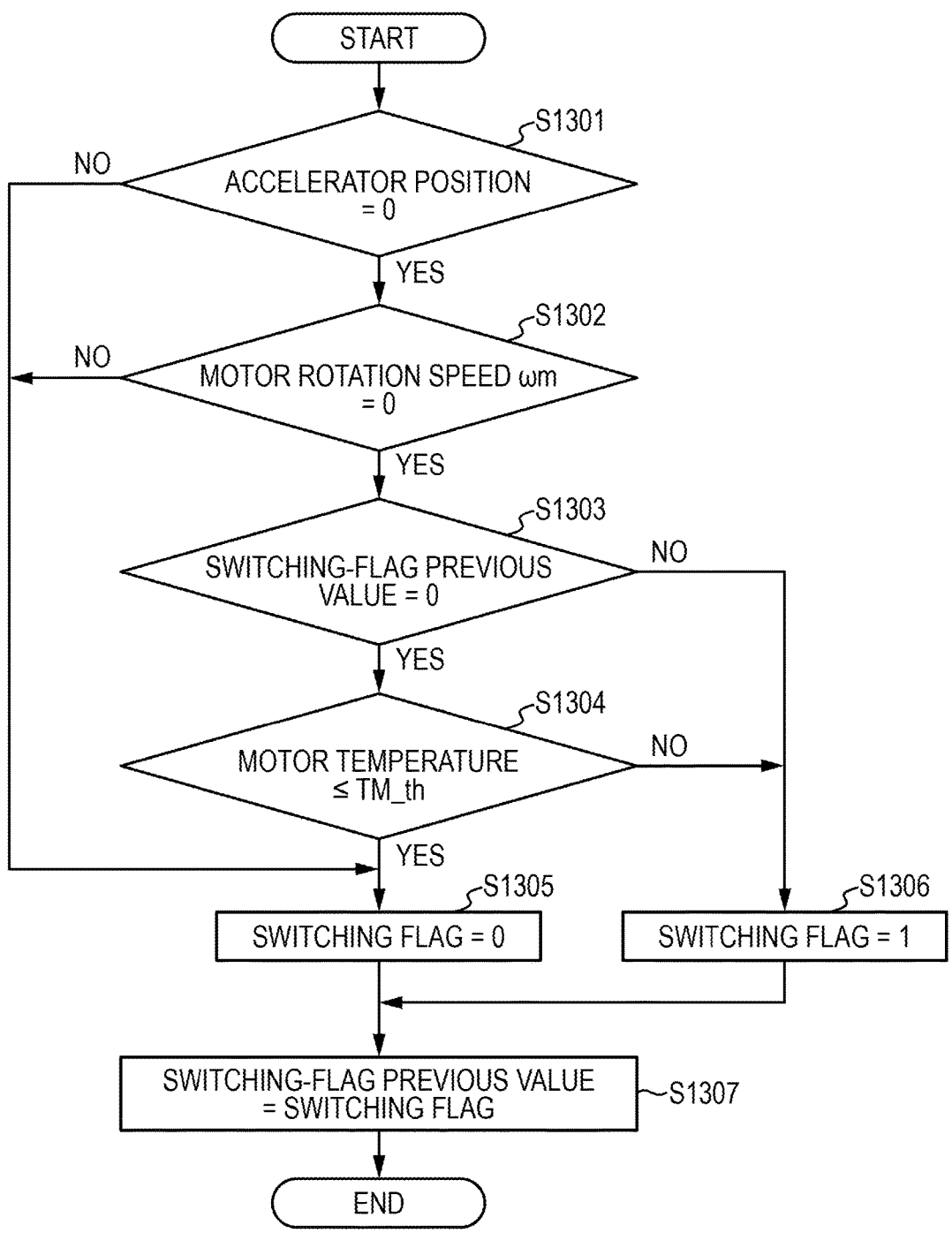
FIG. 13 is a flowchart showing a flow of a switching flag setting according to a second embodiment.

FIG. 13 is a flowchart showing a flow of the switching flag setting in the second embodiment.

In Step S1301, the motor controller 2 determines whether the accelerator position is 0 or not to determine the start intention of the driver. When the accelerator position is 0, the motor controller 2 determines that the driver has no start intention to perform a process in subsequent Step S1302. When the accelerator position is not 0, the motor controller 2 determines that the driver has the start intention to perform a process in Step S1305.

In Step S1302, the motor controller 2 determines whether the motor rotation speed ωm is 0 or not to confirm whether the vehicle is in the vehicle stop state or not. When the motor rotation speed ωm is 0, the motor controller 2 determines that the vehicle is in the vehicle stop state to perform a process in subsequent Step S1303. When the motor rotation speed ωm is not 0, the motor controller 2 determines that the vehicle is in the running state to perform the process in Step S1305.

In Step S1303, the motor controller 2 determines whether the switching-flag previous value is 0 or 1. When the switching-flag previous value is 0, the motor controller 2 performs a process in Step S1304 in order to determine whether the vehicle stop holding means is switched from the motor torque to the friction braking force of the friction brakes 12 or not. When the switching-flag previous value is 1, the motor controller 2 performs a process in Step S1306 in order to hold the vehicle stop state by the friction brakes 12.

In Step S1304, the motor controller 2 determines whether a motor temperature as an index showing the vehicle state is equal to or less than a threshold value TM_th or not. The threshold value TM_th is set to have a sufficient margin with respect to a temperature (a thermal restriction interposing temperature) where thermal restriction interposes a temperature of the motor 4 or the inverter 3. When the motor temperature is equal to or less than the threshold value TM_th, the motor controller 2 determines that there is the sufficient margin with respect to the thermal restriction interposing temperature to perform the process in Step S1305. When the motor temperature is greater than the threshold value TM_th, the motor controller 2 determines that there is no sufficient margin with respect to the thermal restriction interposing temperature to perform the process in Step S1306.

Considering the motor temperature as the index showing the vehicle state can avoid influence of the thermal restriction by temperature rise of the motor 4 or the inverter 3, for example, when it is on a sharp gradient that requires large torque or when the vehicle stops for a long time. It should be noted that the motor temperature may use an effective value detected by a sensor, or may use an estimated value estimated using a known technique.

In Step S1305, the motor controller 2 sets the switching flag to 0 since there is the sufficient margin in the thermal restriction interposing temperature to eliminate the need for the switching to the friction brakes 12 from the aspect of the startability.

In Step S1306, the motor controller 2 sets the switching flag to 1 since there is no sufficient margin in the thermal restriction interposing temperature to require the switching to the friction brakes 12.

In Step S1307, the motor controller 2 stores the switching flag set in Step S1305 or Step S1306 in the switching-flag previous value.

As described above, the control device for electric vehicle in the second embodiment performs the control such that the friction braking amount of the friction brakes 12 converges to the value determined on the basis of the disturbance torque estimated value, and causes the motor torque to converge to almost 0, when the motor rotation speed ωm becomes almost 0, and the temperature of the motor 4 is equal to or more than the predetermined threshold TM_th. This can avoid the unnecessary switching to the friction brakes 12 from the aspect of the startability to avoid the influence of the thermal restriction and ensure the smooth start from the vehicle stop by the motor torque.

—Third Embodiment—

In a control device for electric vehicle in a third embodiment, the vehicle state considered in the switching flag setting is different from those of the first and second embodiments. The following mainly describes a difference according to the switching flag setting from the above-described embodiments, for the control device for electric vehicle in the third embodiment.

Figure 14:
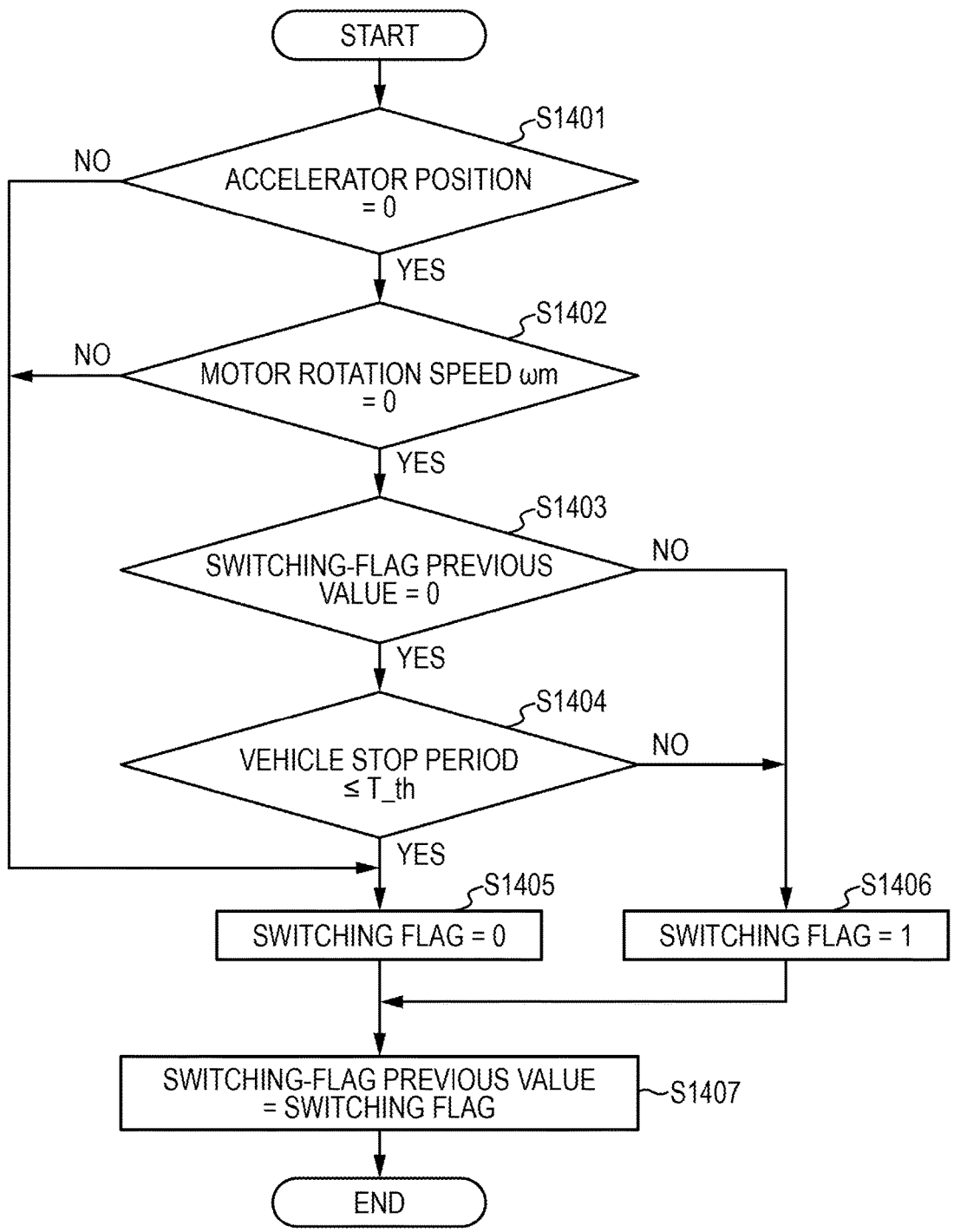
FIG. 14 is a flowchart showing a flow of a switching flag setting according to a third embodiment.

FIG. 14 is a flowchart showing a flow of the switching flag setting in the third embodiment.

In Step S1401, the motor controller 2 determines whether the accelerator position is 0 or not to determine the start intention of the driver. When the accelerator position is 0, the motor controller 2 determines that the driver has no start intention to perform a process in subsequent Step S1402. When the accelerator position is not 0, the motor controller 2 determines that the driver has the start intention to perform a process in Step S1405.

In Step S1402, the motor controller 2 determines whether the motor rotation speed ωm is 0 or not to confirm whether the vehicle is in the vehicle stop state or not. When the motor rotation speed ωm is 0, the motor controller 2 determines that the vehicle is in the vehicle stop state to perform a process in subsequent Step S1403. When the motor rotation speed ωm is not 0, the motor controller 2 determines that the vehicle is in the running state to perform the process in Step S1405.

In Step S1403, the motor controller 2 determines whether the switching-flag previous value is 0 or 1. When the switching-flag previous value is 0, the motor controller 2 performs a process in Step S1404 in order to determine whether the vehicle stop holding means is switched from the motor torque to the friction braking force of the friction brakes 12 or not. When the switching-flag previous value is 1, the motor controller 2 performs a process in Step S1406 in order to hold the vehicle stop state by the friction brakes 12.

In Step S1404, the motor controller 2 determines whether a vehicle stop duration period (a vehicle stop period) as an index showing the vehicle state is equal to or less than a threshold value T_th or not. The threshold value T_th is set to a time that considers the influence on the electricity cost and the thermal restriction by the rise of the motor temperature, and does not make the driver feel an uncomfortable feeling generated such that the vehicle stop holding means switches to the friction brakes 12 during a short vehicle stop period. When the vehicle stop period is equal to or less than the threshold value T_th, the motor controller 2 performs the process in Step S1405. When the vehicle stop period is greater than the threshold value T_th, the motor controller 2 performs the process in Step S1406. A calculation method of the vehicle stop period will be described later.

In Step S1405, the switching to the friction brakes is not necessity since the vehicle stop period is short, the influence of the electricity cost and the thermal restriction by the rise of the motor temperature is small, and switching on each stop/start, for example, in waiting for a traffic light or by traffic jam provides the uncomfortable feeling to the driver. Thus, the motor controller 2 sets the switching flag to 0.

In Step S1406, the switching to the friction brakes is necessity from the aspect of the electricity cost and the thermal restriction to the motor since the vehicle stop period is long. Thus, the motor controller 2 sets the switching flag to 1.

In Step S1407, the motor controller 2 stores the switching flag set in Step S1405 or Step S1406 in the switching-flag previous value.

Figure 15:
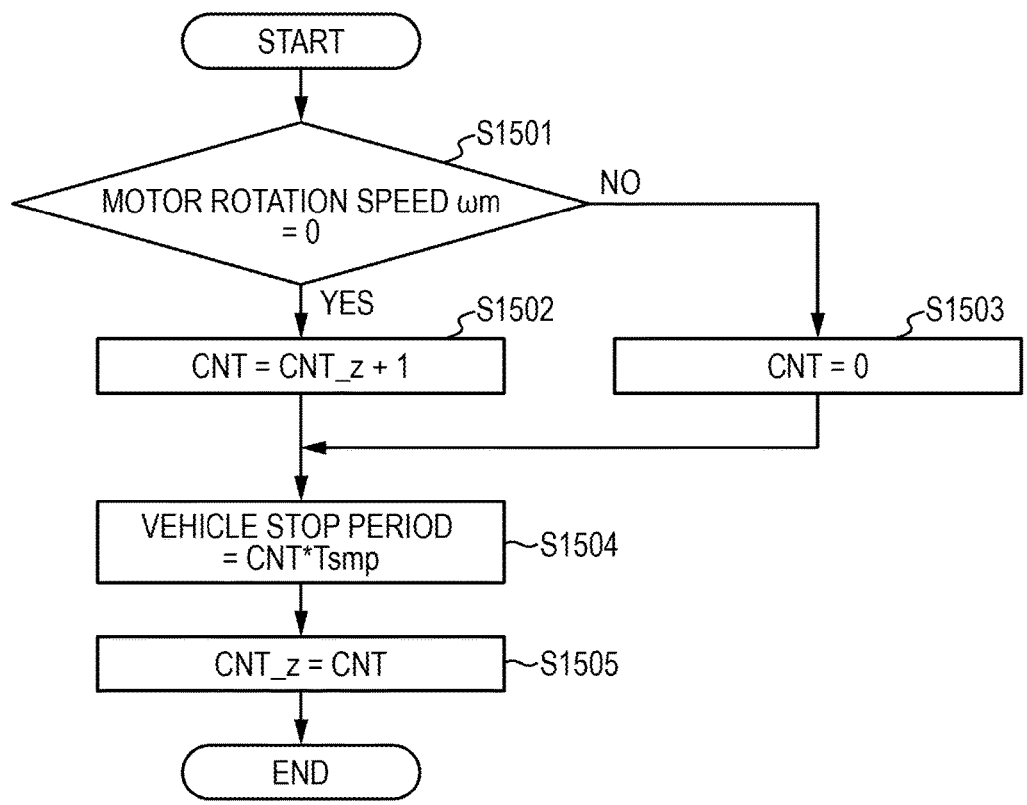
FIG. 15 is a flowchart showing a flow of a vehicle stop period calculation.

The calculation method of the vehicle stop period will be described with reference to FIG. 15.

In Step S1501, the motor controller 2 determines whether the motor rotation speed ωm is 0 or not. When the motor rotation speed ωm is 0, the motor controller 2 determines that the vehicle is in the vehicle stop state to perform a process in subsequent Step S1502. When the motor rotation speed ωm is not 0, the motor controller 2 determines that the vehicle is in the running state to perform a process in Step S1503.

In Step S1502, the motor controller 2 adds 1 to a count previous value CNT_z to calculate a count value CNT.

On the other hand, in Step S1503, the motor controller 2 resets the count value CNT to 0.

In Step S1504, the motor controller 2 multiplies an operation period Tsmp of the motor controller 2 by the count value CNT to calculate the vehicle stop period. The calculated vehicle stop period is used as the vehicle stop duration period (the vehicle stop period) as the index showing the vehicle state in above-described Step S1404.

In Step S1505, the motor controller 2 stores the count value CNT in the count previous value CNT_z.

As described above, the control device for electric vehicle in the third embodiment performs the control such that the friction braking amount of the friction brakes 12 converges to the value determined on the basis of the disturbance torque estimated value, and causes the motor torque to converge to almost 0, when the motor rotation speed ωm becomes almost 0, and the vehicle stop period is equal to or more than the predetermined threshold T_th. This can avoid the frequent switching of the vehicle stop holding means in a scene where the vehicle stop period is short, for example, in waiting for the traffic light or by traffic jam, thus ensuring smooth stop/start by the motor torque in the scene where the vehicle stop period is short.

—Fourth Embodiment—

In a control device for electric vehicle in a fourth embodiment, the vehicle state considered in the switching flag setting is different from those of the first to third embodiments. The following mainly describes a difference according to the switching flag setting from the above-described embodiments, for the control device for electric vehicle in the fourth embodiment.

Figure 16:
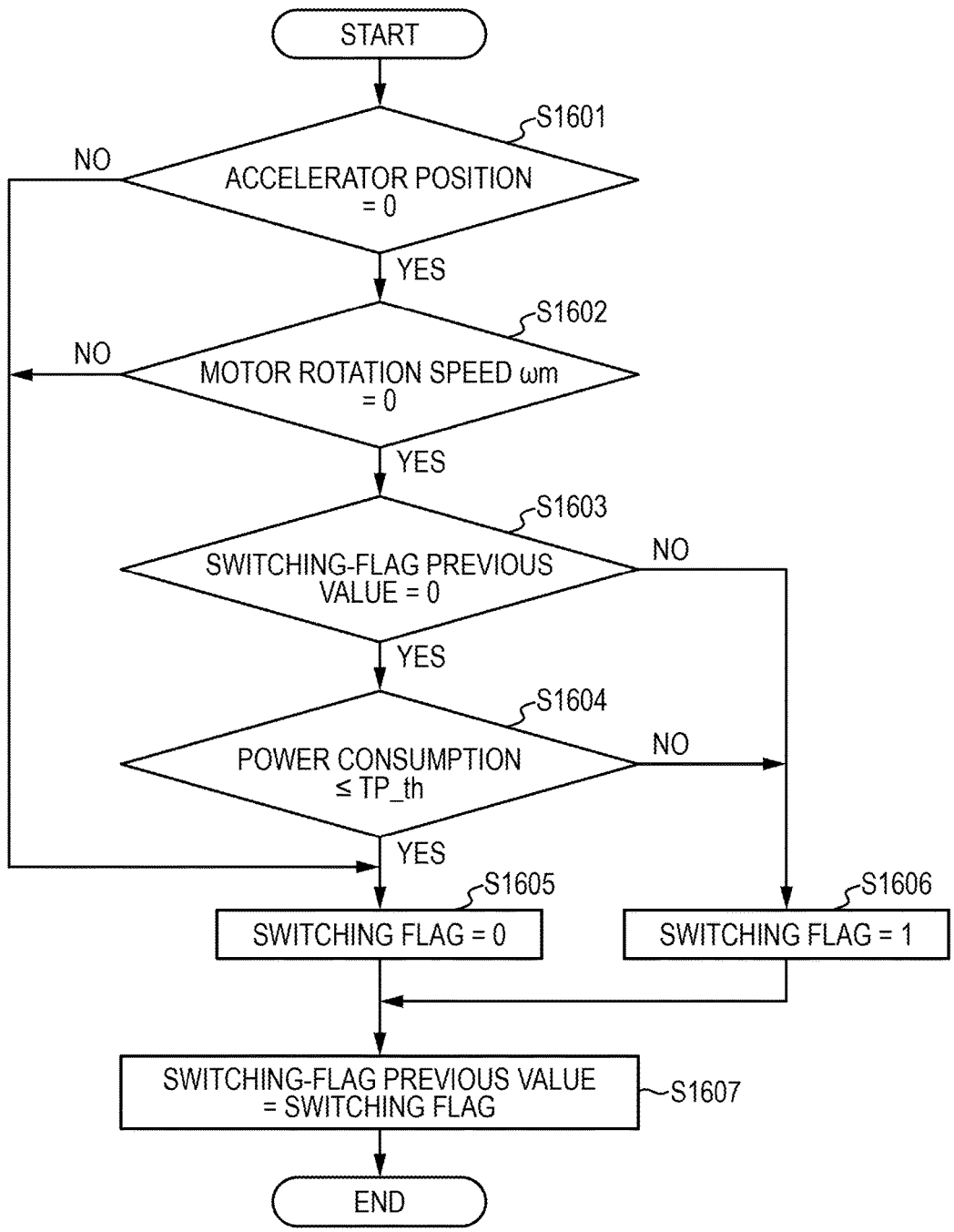
FIG. 16 is a flowchart showing a flow of a switching flag setting according to a fourth embodiment.

FIG. 16 is a flowchart showing a flow of the switching flag setting in the fourth embodiment.

In Step S1601, the motor controller 2 determines whether the accelerator position is 0 or not to determine the start intention of the driver. When the accelerator position is 0, the motor controller 2 determines that the driver has no start intention to perform a process in subsequent Step S1602. When the accelerator position is not 0, the motor controller 2 determines that the driver has the start intention to perform a process in Step S1605.

In Step S1602, the motor controller 2 determines whether the motor rotation speed ωm is 0 or not to confirm whether the vehicle is in the vehicle stop state or not. When the motor rotation speed ωm is 0, the motor controller 2 determines that the vehicle is in the vehicle stop state to perform a process in subsequent Step S1603. When the motor rotation speed ωm is not 0, the motor controller 2 determines that the vehicle is in the running state to perform the process in Step S1605.

In Step S1603, the motor controller 2 determines whether the switching-flag previous value is 0 or 1. When the switching-flag previous value is 0, the motor controller 2 performs a process in Step S1604 in order to determine whether the vehicle stop holding means is switched from the motor torque to the friction braking force of the friction brakes 12 or not. When the switching-flag previous value is 1, the motor controller 2 performs a process in Step S1606 in order to hold the vehicle stop state by the friction brakes 12.

In Step S1604, the motor controller 2 determines whether the power consumption of the motor 4 as an index showing the vehicle state is equal to or less than a threshold value TP_th or not. The threshold value TP_th is set to improve the electricity cost and such that the rise of the motor temperature by increase of the power consumption has the sufficient margin with respect to the thermal restriction interposing temperature. When the power consumption is equal to or less than the threshold value TP_th, the motor controller 2 performs the process in Step S1605. When the power consumption is greater than the threshold value TP_th, the motor controller 2 performs the process in Step S1606.

In Step S1605, the switching to the friction brakes is not necessity from the aspect of the startability since the power consumption is small on a low gradient or the like, and the influence of the electricity cost and the thermal restriction by the rise of the motor temperature is small. Thus, the motor controller 2 sets the switching flag to 0.

In Step S1606, the switching to the friction brakes is necessity from the aspect of the electricity cost and the thermal restriction to the motor since the power consumption is large. Thus, the motor controller 2 sets the switching flag to 1.

In Step S1607, the motor controller 2 stores the switching flag set in Step S1605 or Step S1606 in the switching-flag previous value.

As described above, the control device for electric vehicle in the fourth embodiment performs the control such that the friction braking amount of the friction brakes 12 converges to the value determined on the basis of the disturbance torque estimated value, and causes the motor torque to converge to almost 0, when the motor rotation speed ωm becomes almost 0, and the power consumption is equal to or more than the predetermined threshold TP_th. This can ensure the smooth start from the vehicle stop by the motor torque without the switching to the friction brakes in a scene where the power consumption of the motor is small to decrease the influence on the electricity cost, for example, on the low gradient road.

The present invention is not limited to the above-described one embodiment, but various modifications and applications are possible. For example, the above-described explanation describes that, when the accelerator operation amount is equal to or less than the predetermined value and the electric vehicle is just before the stop, the motor torque command value Tm* converges to the disturbance torque estimated value $T_d$ (or 0) in conjunction with the reduction in the rotation speed of the motor 4. However, since the speed parameters such as the wheel speed, the vehicle body speed, and the rotation speed of the drive shaft are proportional relationship with the rotation speed of the motor 4, the motor torque command value Tm* may be converged to the disturbance torque estimated value $T_d$ (or 0) in conjunction with the reduction in speed parameter, which is proportionate to the rotation speed of the motor 4.

The above-described explanation describes the friction brakes 12 that act on the drive wheels 9a and 9b as the configuration that functions as the friction braking portion, however it is not necessarily limited to this. For example, the configuration that functions as the friction braking portion may be a shaft brake that acts on the rotation of the drive shaft 8.

This application claims priority based on Japanese Patent Application No. 2015-167173, filed with the Japan Patent Office on Aug. 26, 2015, the entire contents of which are incorporated into this specification by reference.

The invention claimed is:

1. A control method for electric vehicle including a motor that functions as a traveling driving source and provides a regenerative braking force to a vehicle, and a friction braking portion that provides a friction braking force to the vehicle, the control method comprising:
   detecting a speed parameter proportionate to a running speed of the electric vehicle;
   estimating, via a controller, a disturbance torque that acts on the motor;
   performing, via a controller, a control such that the motor torque converges to an estimated value of the disturbance torque as the speed parameter decreases; and
   performing, via a controller, a control such that a friction braking amount of the friction braking portion converges to a value determined on the basis of the estimated value of the disturbance torque, and causing the motor torque to converge to almost 0 when the speed parameter becomes almost 0, and the vehicle is determined to be in a vehicle stop state.

2. The control method for electric vehicle according to claim 1, wherein
the value to which the friction braking amount is caused to converge is equal to or more than a difference between the estimated value of the disturbance torque and the motor torque.

3. The control method for electric vehicle according to claim 1, wherein
a rate of change of the motor torque when the motor torque is caused to converge to a predetermined value is adjusted corresponding to a response delay with respect to a command value of the friction braking amount.

4. The control method for electric vehicle according to claim 1, comprising:
setting a first torque target value on the basis of vehicle information;
setting a second torque target value that converges to the estimated value of the disturbance torque as the speed parameter decreases;
comparing the first torque target value with the second torque target value to set a greater value as a third torque target value; and
causing the motor torque to converge to the third torque target value, and causing the friction braking amount to converge to 0 when the electric vehicle starts from a state that holds a vehicle stop state by the friction braking amount.

5. The control method for electric vehicle according to claim 4, wherein
a rate of change of the motor torque when the motor torque is caused to converge to the third torque target value is adjusted corresponding to a response delay with respect to a command value of the friction braking amount.

6. The control method for electric vehicle according to claim 1, comprising
when the speed parameter becomes almost 0, and a parameter that is an index showing the vehicle state and different from the speed parameter is equal to or more than a predetermined value, performing a control such that the friction braking amount of the friction braking portion converges to the value determined on the basis of the estimated value of the disturbance torque, and causing the motor torque to converge to almost 0.

7. The control method for electric vehicle according to claim 6, wherein
the parameter is the estimated value of the disturbance torque that acts on the motor, and
when the speed parameter becomes almost 0, and the estimated value of the disturbance torque is equal to or more than a predetermined threshold, the control method performs a control such that the friction braking amount of the friction braking portion converges to the value determined on the basis of the estimated value of the disturbance torque, and causing the motor torque to converge to almost 0.

8. The control method for electric vehicle according to claim 6, comprising:
detecting a temperature of the motor as the parameter, and
when the speed parameter becomes almost 0, and the temperature of the motor is equal to or more than a predetermined threshold, performing a control such that the friction braking amount of the friction braking portion converges to the value determined on the basis of the estimated value of the disturbance torque, and causing the motor torque to converge to almost 0.

9. The control method for electric vehicle according to claim 6, comprising:
calculating a vehicle stop period of the electric vehicle as the parameter,
when the speed parameter becomes almost 0, and the vehicle stop period is equal to or more than a predetermined threshold, performing a control such that the friction braking amount of the friction braking portion converges to the value determined on the basis of the estimated value of the disturbance torque, and causing the motor torque to converge to almost 0.

10. The control method for electric vehicle according to claim 6, comprising:
calculating a power consumption of the motor as the parameter, and
when the speed parameter becomes almost 0, and the power consumption is equal to or more than a predetermined threshold, performing a control such that the friction braking amount of the friction braking portion converges to the value determined on the basis of the estimated value of the disturbance torque, and causing the motor torque to converge to almost 0.

11. The control method for electric vehicle according to claim 6, comprising:
detecting an amount of accelerator operation that is an operation state of an accelerator pedal, and
when a control is performed such that the friction braking amount of the friction braking portion converges to the value determined on the basis of the estimated value of the disturbance torque, and the motor torque converges to almost 0, maintaining a state where the friction braking amount has converged to the disturbance torque until the amount of accelerator operation has increased.

12. A control device for electric vehicle including a motor that functions as a traveling driving source and provides a regenerative braking force to a vehicle, a friction braking portion that provides a friction braking force to the vehicle, and a controller that controls the motor and the friction braking portion, wherein the controller is programmed to:
detect a speed parameter proportionate to a running speed of the electric vehicle;
estimate a disturbance torque that acts on the motor;
control a friction braking amount of the friction braking portion; and
control a torque of the motor, wherein
when the speed parameter becomes almost 0, and the vehicle is determined to be in a vehicle stop state, cause the friction braking amount to electrically converge to a value determined on the basis of an estimated value of the disturbance torque, and cause the motor torque to converge to almost 0.

* * * * *